(12) United States Patent
Yamamoto et al.

(10) Patent No.: US 9,296,289 B2
(45) Date of Patent: Mar. 29, 2016

(54) HYBRID VEHICLE AND CONTROL METHOD OF HYBRID VEHICLE

(75) Inventors: Masaya Yamamoto, Kasugai (JP); Hiroyuki Takayanagi, Toyokawa (JP)

(73) Assignee: TOYOTA JIDOSHA KABUSHIKI KAISHA, Toyota-Shi (JP)

(*) Notice: Subject to any disclaimer, the term of this patent is extended or adjusted under 35 U.S.C. 154(b) by 0 days.

(21) Appl. No.: 13/266,357

(22) PCT Filed: Apr. 27, 2009

(86) PCT No.: PCT/JP2009/058250
§ 371 (c)(1),
(2), (4) Date: Oct. 26, 2011

(87) PCT Pub. No.: WO2010/125628
PCT Pub. Date: Nov. 4, 2010

(65) Prior Publication Data
US 2012/0041630 A1 Feb. 16, 2012

(51) Int. Cl.
*B60W 20/00* (2006.01)
*B60K 6/365* (2007.10)
(Continued)

(52) U.S. Cl.
CPC .................. *B60K 6/365* (2013.01); *B60K 6/445* (2013.01); *B60K 6/52* (2013.01); *B60K 6/547* (2013.01);
(Continued)

(58) Field of Classification Search
CPC .......... B60W 10/06; B60W 2510/244; B60W 2520/10; Y02T 90/14; Y02T 10/6269; B60K 6/365
USPC ........................... 701/22; 180/65.28; 903/930
See application file for complete search history.

(56) References Cited

U.S. PATENT DOCUMENTS 5,842,534 A * 12/1998 Frank .................... 180/65.25
5,846,155 A * 12/1998 Taniguchi et al. ............ 477/2
(Continued)

FOREIGN PATENT DOCUMENTS

EP 1375241 A1 1/2004
EP 1674328 A1 6/2006
(Continued)

OTHER PUBLICATIONS

JPO machine translation of JP 2006-170128 (publication date of JP document: Jun. 29, 2006).*
(Continued)

Primary Examiner — Behrang Badii
Assistant Examiner — David Testardi
(74) Attorney, Agent, or Firm — Kenyon & Kenyon LLP

(57) ABSTRACT

The vehicle speed is set as the intermittent operation prohibition vehicle speed before the accumulated charge amount condition where each accumulated charge amount of the master battery and the slave battery becomes each preset value is satisfied, and the vehicle speed that is less than the vehicle speed is set as the intermittent operation prohibition vehicle speed after the accumulated charge amount condition is satisfied. Then, when the vehicle speed is less than the intermittent operation prohibition vehicle speed, the engine and the motor are controlled so that the hybrid vehicle is driven with the priority to the motor travel where the hybrid vehicle is driven with input and output power to and from the motor before accumulated charge amount condition is satisfied, and the engine and the motor are controlled so that the hybrid vehicle is driven with the intermittent operation of the engine corresponding to the power demand after the accumulated charge amount condition is satisfied.

2 Claims, 9 Drawing Sheets

(51) Int. Cl.
*B60K 6/445* (2007.10)
*B60K 6/52* (2007.10)
*B60K 6/547* (2007.10)
*B60W 10/06* (2006.01)
*B60W 10/08* (2006.01)
*B60K 1/02* (2006.01)

(52) U.S. Cl.
CPC .............. *B60W 10/06* (2013.01); *B60W 10/08* (2013.01); *B60W 20/00* (2013.01); *B60K 1/02* (2013.01); *B60L 2240/441* (2013.01); *B60L 2240/486* (2013.01); *B60W 2510/0638* (2013.01); *B60W 2510/244* (2013.01); *B60W 2520/10* (2013.01); *B60W 2540/10* (2013.01); *B60W 2540/12* (2013.01); *B60W 2540/16* (2013.01); *B60W 2710/0616* (2013.01); *Y02T 10/48* (2013.01); *Y02T 10/6239* (2013.01); *Y02T 10/6265* (2013.01); *Y02T 10/6269* (2013.01); *Y02T 10/6286* (2013.01)

(56) References Cited

U.S. PATENT DOCUMENTS

| | | | | |
|---|---|---|---|---|
| 6,116,363 | A * | 9/2000 | Frank | 180/65.25 |
| 6,687,581 | B2 * | 2/2004 | Deguchi et al. | 701/22 |
| 6,694,232 | B2 * | 2/2004 | Saito et al. | 701/22 |
| 6,722,457 | B2 * | 4/2004 | Yamaguchi et al. | 180/65.235 |
| 7,023,150 | B2 * | 4/2006 | Hisada et al. | 318/34 |
| 7,255,662 | B2 * | 8/2007 | Hiroe et al. | 477/3 |
| 7,317,985 | B2 * | 1/2008 | Suzuki | 701/113 |
| 7,631,710 | B2 * | 12/2009 | Utsumi | 180/65.21 |
| 7,836,987 | B2 * | 11/2010 | Aoki | 180/65.265 |
| 7,847,495 | B2 * | 12/2010 | Oyobe et al. | 318/53 |
| 8,088,035 | B2 * | 1/2012 | Yamamoto | 477/3 |
| 8,186,465 | B2 * | 5/2012 | Oyobe et al. | 180/65.275 |
| 8,229,612 | B2 * | 7/2012 | Itoh et al. | 701/22 |
| 8,249,769 | B2 * | 8/2012 | Itoh et al. | 701/22 |
| 2008/0296908 | A1 * | 12/2008 | Utsumi | 290/40 C |
| 2008/0319594 | A1 | 12/2008 | Shibata et al. | |
| 2009/0277702 | A1 * | 11/2009 | Kanada et al. | 180/65.29 |

FOREIGN PATENT DOCUMENTS

| | | | | | |
|---|---|---|---|---|---|
| EP | 1920985 | A1 * | 5/2008 | | B60L 11/18 |
| EP | 1920986 | A1 * | 5/2008 | | B60W 10/08 |
| EP | 1932740 | A1 * | 6/2008 | | B60W 20/00 |
| JP | 06141406 | A * | 5/1994 | | B60L 11/12 |
| JP | 2006-083706 | A | 3/2006 | | |
| JP | 2006-152866 | A | 6/2006 | | |
| JP | 2006-170128 | A | 6/2006 | | |
| JP | 2007131103 | A * | 5/2007 | | |
| JP | 2007141558 | A * | 6/2007 | | |
| JP | 2008-168671 | A | 7/2008 | | |
| JP | 2008-247206 | A | 10/2008 | | |
| JP | 2008284908 | A * | 11/2008 | | |
| WO | WO 2008/120779 | A1 * | 10/2008 | | B60W 10/06 |
| WO | WO 2008/133248 | A1 * | 11/2008 | | B60W 10/26 |
| WO | WO 2009068964 | A1 * | 6/2009 | | B60W 20/00 |

OTHER PUBLICATIONS

JPO machine translation of JP 2007-131103 (publication date of JP document: May 31, 2007).*
Google Machine Translation of WO 2008-120779 (publication date of WO document: Oct. 9, 2008).*
Google Machine Translation of WO 2008-133248 (publication date of WO document: Nov. 6, 2008).*
GM Volt post, "Chevy Volt rollout and captured test fleet plans", Oct. 22, 2008, downloaded from http://gm-volt.com/2008/10/22/chevy-volt-rollout-and-captu red-test-fleet-plans/.*
International Search Report mailed May 26, 2009 & Written Opinion (in Japanese).

* cited by examiner

HYBRID VEHICLE AND CONTROL METHOD OF HYBRID VEHICLE

This is a 371 national phase application of PCT/JP2009/058250 filed 27 Apr. 2009, the contents of which are incorporated herein by reference.

TECHNICAL FIELD

The present invention relates to a hybrid vehicle and a control method of the hybrid vehicle.

BACKGROUND ART

One proposed hybrid vehicle has an engine, a first motor generator (MG1), a planetary gear that is connected to the engine and the motor generator MG1 and connected to front wheels via gear, a second motor generator (MG2) that is connected to the front wheels side of the planetary gear, a battery that transmits electric power to and from the motor generators MG1 and MG2. The proposed hybrid vehicle is driven with an operation of the engine when a vehicle speed of the hybrid vehicle is more than an intermittent operation prohibition vehicle speed for prohibiting stop of the engine, and driven with an intermittent operation of the engine in response to a driving power required for driving the hybrid vehicle when the vehicle speed is less than or equal to the intermittent operation prohibition vehicle speed (see, for example, Patent Document 1). This vehicle sets a first value as the intermittent operation prohibition vehicle speed for prohibiting the intermittent operation of the engine when a battery temperature is low, and sets a second value that is less than the first value as the intermittent operation prohibition vehicle speed of the engine when the battery temperature is high. Therefore, this vehicle prevents a decrease of the battery life by an expansion of a range where the engine is continuously operated, when the battery temperature is high.

PRIOR ART DOCUMENT

Patent Document

Patent Document 1: Japanese Patent Laid-Open No. 2006-170128

SUMMARY OF THE INVENTION

In a case that the vehicle speed is less than or equal to the above described intermittent operation prohibition vehicle speed, some of hybrid vehicles are driven with a priority to motor travel between the motor travel where the hybrid vehicle is driven only with input and output power to and from the motor and hybrid travel where the hybrid vehicle is driven with output power from the engine when the accumulated charge amount is high at system startup of the hybrid vehicle, and driven with the motor travel or the hybrid travel in response to a driving power after the accumulated charge amount decreases. In their hybrid vehicles, it is required to enable to more certainly travel in the motor travel until the accumulated charge amount decreases. In their hybrid vehicles, there is a case that it is required to more sufficiently prevent a disadvantage of operation stop of the engine in a high vehicle speed range after a travel with the priority to the motor travel is cancelled.

In a hybrid vehicle and a control method of the hybrid vehicle of the invention, the main object of the invention is, in a case that the hybrid vehicle is driven with a priority to motor travel between the motor travel where the hybrid vehicle is driven only with input and output power to and from the motor and hybrid travel where the hybrid vehicle is driven with output power from the internal combustion engine before an accumulated charge amount condition where a state of an accumulator unit becomes a predetermined low accumulated charge amount state is satisfied after a system of the hybrid vehicle is started up, to enable the hybrid vehicle to be driven more certainly in the motor travel before the accumulated charge amount condition is satisfied after the system of the hybrid vehicle is started up, and to more sufficiently prevent a disadvantage of operation stop of an internal combustion engine in a high vehicle speed range after the accumulated charge amount condition is satisfied.

In order to attain the main object, the hybrid vehicle and the control of the hybrid vehicle of the invention have the configurations discussed below.

According to one aspect, the present invention is directed to a hybrid vehicle. The hybrid vehicle, including: an internal combustion engine that outputs power for driving the hybrid vehicle; a generator that generates electric power using output power from the internal combustion engine; a motor that inputs and outputs power for driving the hybrid vehicle; an accumulator that transmits electric power to and from the generator and the motor; a vehicle speed detector that detects a vehicle speed of the hybrid vehicle; a driving power demand setting module configured to set a driving power demand required for driving the hybrid vehicle; an intermittent operation prohibition vehicle speed setting module configured to set a first vehicle speed as an intermittent operation prohibition vehicle speed for prohibiting an intermittent operation of the internal combustion engine before an accumulated charge amount condition where a state of the accumulator becomes a predetermined low accumulated charge amount state is satisfied after a system of the hybrid vehicle is started up, while setting a second vehicle speed that is less than the first vehicle speed as the intermittent operation prohibition vehicle speed after the accumulated charge amount condition is satisfied; and a control module configured to, in a case that the detected vehicle speed is more than or equal to the set intermittent operation prohibition vehicle speed, control the internal combustion engine, the generator and the motor so that the hybrid vehicle is driven with a driving power corresponding to the set driving power demand with a continuous operation of the internal combustion engine, in a case that the detected vehicle speed is less than the set intermittent operation prohibition vehicle speed before the accumulated charge amount condition is satisfied, the control module controlling the internal combustion engine, the generator and the motor so that the hybrid vehicle is driven with the driving power corresponding to the set driving power demand with a priority to motor travel between the motor travel where the hybrid vehicle is driven only with input and output power to and from the motor and hybrid travel where the hybrid vehicle is driven with output power from the internal combustion engine, and in a case that the detected vehicle speed is less than the set intermittent operation prohibition vehicle speed after the accumulated charge amount condition is satisfied, the control module controlling the internal combustion engine, the generator and the motor so that the hybrid vehicle is driven with the driving power corresponding to the set driving power demand with the intermittent operation of the internal combustion engine.

The hybrid vehicle according to this aspect of the invention sets a first vehicle speed as an intermittent operation prohibition vehicle speed for prohibiting an intermittent operation of the internal combustion engine before an accumulated charge amount condition where a state of the accumulator becomes a predetermined low accumulated charge amount state is satisfied after a system of the hybrid vehicle is started up, while setting a second vehicle speed that is less than the first vehicle speed as the intermittent operation prohibition vehicle speed after the accumulated charge amount condition is satisfied. In a case that a vehicle speed of the hybrid vehicle is more than or equal to the set intermittent operation prohibition vehicle speed, the vehicle of the invention controls the internal combustion engine, the generator and the motor so that the hybrid vehicle is driven with a driving power corresponding to a driving power demand required for driving the hybrid vehicle with a continuous operation of the internal combustion engine. In a case that the vehicle speed is less than the set intermittent operation prohibition vehicle speed before the accumulated charge amount condition is satisfied, the vehicle of the invention controls the internal combustion engine, the generator and the motor so that the hybrid vehicle is driven with the driving power corresponding to the driving power demand with a priority to motor travel between the motor travel where the hybrid vehicle is driven only with input and output power to and from the motor and hybrid travel where the hybrid vehicle is driven with output power from the internal combustion engine. In a case that the vehicle speed is less than the set intermittent operation prohibition vehicle speed after the accumulated charge amount condition is satisfied, the vehicle of the invention controls the internal combustion engine, the generator and the motor so that the hybrid vehicle is driven with the driving power corresponding to the driving power demand with the intermittent operation of the internal combustion engine. That is to say, before the accumulated charge amount condition is satisfied after the system of the hybrid vehicle is started up, the first vehicle speed that is higher than after the accumulated charge amount condition is satisfied is set as the intermittent operation prohibition vehicle speed, and the hybrid vehicle is driven with the priority to the motor travel when the vehicle speed is less than the intermittent operation prohibition vehicle speed. Therefore, this arrangement enables the hybrid vehicle to be driven more certainly in the motor travel before the accumulated charge amount condition is satisfied after the system of the hybrid vehicle is started up. After the accumulated charge amount condition is satisfied, the second vehicle speed that is relatively low is set as the intermittent operation prohibition vehicle speed. Therefore, this arrangement enables to more sufficiently prevent a disadvantage of operation stop of the internal combustion engine in a high vehicle speed range than before the accumulated charge amount condition is satisfied. The disadvantage, for example, decrease of responsiveness against an acceleration request by the driver in the high vehicle speed range can be prevented.

In one preferable application of the hybrid vehicle of the invention, the hybrid vehicle may further including: a charger that is connected to an external power supply that is a power supply outside the hybrid vehicle to charge the accumulator with electric power from the external power supply, wherein the accumulated charge amount condition may be a condition that is satisfied when the state of the accumulator becomes the predetermined low accumulated charge amount state after the system of the hybrid vehicle is started up with a state of the accumulator being charged with electric power from the external power supply.

In another preferable application of the hybrid vehicle of the invention, the hybrid vehicle may further including: a cancellation instruction switch that instructs cancellation of the priority to the motor travel, wherein the control module, when the cancellation instruction switch is on even in the case that the detected vehicle speed is less than the set intermittent operation prohibition vehicle speed before the accumulated charge amount condition is satisfied, may control the internal combustion engine, the generator and the motor so that the hybrid vehicle is driven with the driving power corresponding to the set driving power demand with the intermittent operation of the internal combustion engine. When the cancellation instruction switch is on even before the accumulated charge amount condition is satisfied, this arrangement enables the hybrid vehicle to be driven in response to an instruction by the cancellation instruction switch.

In one preferable application of the hybrid vehicle of the invention, the hybrid vehicle may further including: a driving power limit setting module configured to set a driving power limit of the motor based on input and output limits of the accumulator, wherein the control module, when the set driving power demand exceeds the set driving power limit even in the case the detected vehicle speed is less than the set intermittent operation prohibition vehicle speed before the accumulated charge amount condition is satisfied, may control the internal combustion engine, the generator, and the motor so that the hybrid vehicle is driven with the driving power corresponding to the set driving power demand in the hybrid travel. In the vehicle of this arrangement, the hybrid vehicle may further including: a first voltage converter that is connected to first low-voltage system power lines where the accumulator is connected and connected to high-voltage system power lines where a driving circuit of the generator and a driving circuit of the motor are connected, and that supplies electric power from the accumulator to the high-voltage system power lines with voltage step-up, a second accumulator that charges and discharges, a third accumulator that charges and discharges, and a second voltage converter that is connected to the high-voltage system power lines and connected to a second low-voltage system power lines where the second accumulator and the third accumulator are connected via each relay, and that supplies electric power from one accumulator currently connected to the second low-voltage system power lines between the second accumulator and the third accumulator to the high-voltage system power lines with voltage step-up, wherein the accumulated charge amount condition may be a condition that is satisfied when all of the state of the accumulator, a state of the second accumulator and a state of the third accumulator become the predetermined low accumulated charge amount state, the driving power limit setting module may set the driving power limit of the motor based on the input and output limits of the accumulator and input and output limits of the second accumulator when the second accumulator is connected with the second low-voltage system power lines, may set the driving power limit of the motor based on the input and output limits of the accumulator and input and output limits of the third accumulator when the third accumulator is connected with the second low voltage system, and may set the driving power limit of the motor based on the input and output limits of the accumulator when both the second accumulator and the third accumulator are disconnected from the second low voltage system, and the control module, after the accumulated charge amount condition is satisfied, may control the internal combustion engine, the generator, and the motor, the first voltage converter and the second voltage converter so that the hybrid vehicle is driven with the state of both the second accumulator and the third accumulator being disconnected from the second voltage converter. In this arrangement, when the second accumulator or the third accumulator is connected to the second voltage converter before the accumulated charge amount condition is satisfied, it is more difficult for the driving power demand to exceed the driving power limit of the motor than after the accumulated charge amount condition is satisfied. Therefore, this arrangement enables the hybrid vehicle to be driven more certainly in the motor travel.

In one preferable application of the hybrid vehicle of the invention, the hybrid vehicle may further including: a three shaft-type power input output structure that is connected to three shafts, the driveshaft linked to driving wheels, the output shaft of the internal combustion engine, and a rotating shaft of the generator, and that is designed to input and output power to residual shaft based on powers input from and output to any two shafts among the three shafts. In this case, the 'three shaft-type power input output structure' may be a single pinion-type planetary gear mechanism or a double pinion-type planetary gear mechanism, or may be a differential gear.

According to another aspect, the present invention is directed to a control method of a hybrid vehicle having an internal combustion engine that outputs power for driving the hybrid vehicle, a generator that generates electric power using output power from the internal combustion engine, a motor that inputs and outputs power for driving the hybrid vehicle, an accumulator that transmits electric power to and from the generator and the motor, the control method including the steps of: (a) setting a first vehicle speed as an intermittent operation prohibition vehicle speed for prohibiting an intermittent operation of the internal combustion engine before an accumulated charge amount condition where a state of the accumulator becomes a predetermined low accumulated charge amount state is satisfied after a system of the hybrid vehicle is started up, while setting a second vehicle speed that is less than the first vehicle speed as the intermittent operation prohibition vehicle speed after the accumulated charge amount condition is satisfied; and (b) in a case that a vehicle speed of the hybrid vehicle is more than or equal to the set intermittent operation prohibition vehicle speed, controlling the internal combustion engine, the generator, and the motor so that the hybrid vehicle is driven with a driving power corresponding to a driving power demand required for driving the hybrid vehicle with a continuous operation of the internal combustion engine, in a case that the vehicle speed is less than the set intermittent operation prohibition vehicle speed before the accumulated charge amount condition is satisfied, controlling the internal combustion engine, the generator, and the motor so that the hybrid vehicle is driven with the driving power corresponding to the driving power demand with a priority to motor travel between the motor travel where the hybrid vehicle is driven only with input and output power to and from the motor and hybrid travel where the hybrid vehicle is driven with output power from the internal combustion engine, and in a case that the vehicle speed is less than the set intermittent operation prohibition vehicle speed after the accumulated charge amount condition is satisfied, controlling the internal combustion engine, the generator, and the motor so that the hybrid vehicle is driven with the driving power corresponding to the driving power demand with the intermittent operation of the internal combustion engine.

The control method of the hybrid vehicle according to this aspect of the invention, sets a first vehicle speed as an intermittent operation prohibition vehicle speed for prohibiting an intermittent operation of the internal combustion engine before an accumulated charge amount condition where a state of the accumulator becomes a predetermined low accumulated charge amount state is satisfied after a system of the hybrid vehicle is started up, while setting a second vehicle speed that is less than the first vehicle speed as the intermittent operation prohibition vehicle speed after the accumulated charge amount condition is satisfied. In a case that a vehicle speed of the hybrid vehicle is more than or equal to the set intermittent operation prohibition vehicle speed, the control method of the vehicle of the invention controls the internal combustion engine, the generator, and the motor so that the hybrid vehicle is driven with a driving power corresponding to a driving power demand required for driving the hybrid vehicle with a continuous operation of the internal combustion engine. In a case that the vehicle speed is less than the set intermittent operation prohibition vehicle speed before the accumulated charge amount condition is satisfied, the control method of the vehicle of the invention controls the internal combustion engine, the generator, and the motor so that the hybrid vehicle is driven with the driving power corresponding to the driving power demand with a priority to motor travel between the motor travel where the hybrid vehicle is driven only with input and output power to and from the motor and hybrid travel where the hybrid vehicle is driven with output power from the internal combustion engine. In a case that the vehicle speed is less than the set intermittent operation prohibition vehicle speed after the accumulated charge amount condition is satisfied, the control method of the vehicle of the invention controls the internal combustion engine, the generator, and the motor so that the hybrid vehicle is driven with the driving power corresponding to the driving power demand with the intermittent operation of the internal combustion engine. That is to say, before the accumulated charge amount condition is satisfied after the system of the hybrid vehicle is started up, the first vehicle speed that is higher than after the accumulated charge amount condition is satisfied is set as the intermittent operation prohibition vehicle speed, and the hybrid vehicle is driven with the priority to the motor travel when the vehicle speed is less than the intermittent operation prohibition vehicle speed. Therefore, this arrangement enables the hybrid vehicle to be driven more certainly in the motor travel before the accumulated charge amount condition is satisfied after the system of the hybrid vehicle is started up. After the accumulated charge amount condition is satisfied, the second vehicle speed that is relatively low is set as the intermittent operation prohibition vehicle speed. Therefore, this arrangement enables to more sufficiently prevent a disadvantage of operation stop of the internal combustion engine in a high vehicle speed range than before the accumulated charge amount condition is satisfied. The disadvantage, for example, decrease of responsiveness against an acceleration request by the driver in the high vehicle speed range can be prevented.

MODES FOR CARRYING OUT THE INVENTION

One mode for carrying out the invention is discussed below as a preferred embodiment.

Figure 1:
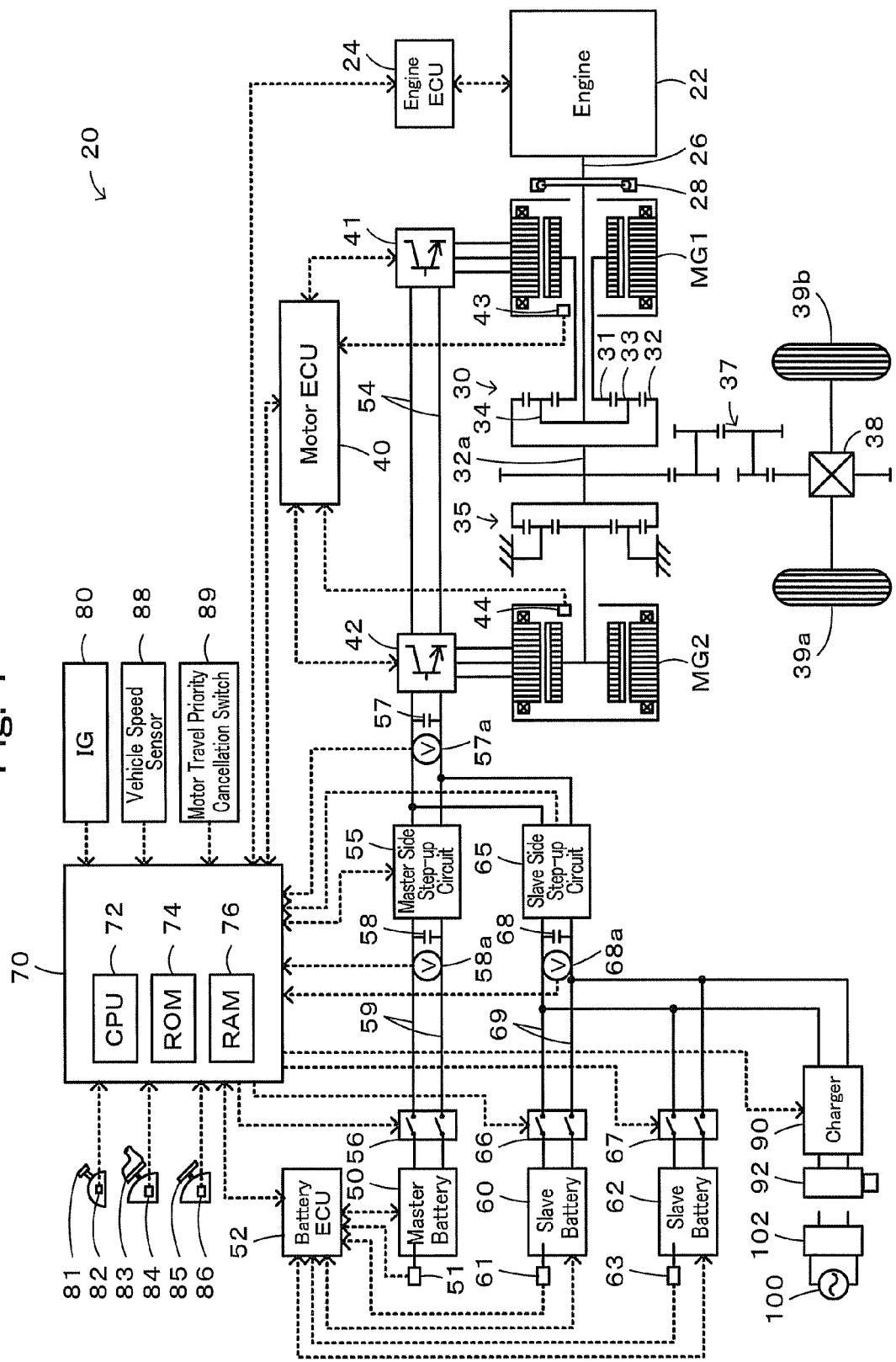
FIG. 1 schematically illustrates the configuration of a hybrid vehicle 20 in one embodiment of the invention.

FIG. 1 schematically illustrates the configuration of a hybrid vehicle 20 in one embodiment according to the invention. As illustrated, the hybrid vehicle 20 of the embodiment includes an engine 22, a three shaft-type power distribution integration mechanism 30 connected via a damper 28 to a crankshaft 26 or an output shaft of the engine 22, a motor MG1 connected to the power distribution integration mechanism 30 and designed to have power generation capability, a motor MG2 connected via a reduction gear 35 to a ring gear shaft 32a or a driveshaft linked with the power distribution integration mechanism 30, inverters 41 and 42 each for driving the motors MG1 and MG2, a master battery 50 capable of charge and discharge, a master side step-up circuit 55 supplying electric power from the master battery 50 to the inverters 41 and 42 with voltage step-up, a system main relay 56 connecting and disconnecting the master battery 50 to and from the master side step-up circuit 55, slave batteries 60 and 62 capable of charge and discharge, a slave side step-up circuit 65 supplying electric power from the slave batteries 60 and 62 to the inverters 41 and 42 with voltage step-up, system main relays 66 and 67 each connecting and disconnecting each of the slave batteries 60 and 62 to and from the slave side step-up circuit 65, and a hybrid electronic control unit 70 configured to control the operations of the whole hybrid vehicle 20. For convenience of explanation, the side of the inverters 41 and 42 from the master side step-up circuit 55 and the slave side step-up circuit 65 is described as a high-voltage system, the side of the master battery 50 from the master side step-up circuit 55 is described as a first low-voltage system, and the side of the slave batteries 60 and 62 from the slave side step-up circuit 65 is described as a second low-voltage system hereafter.

The engine 22 is constructed as an internal combustion engine designed to consume a hydrocarbon fuel, such as gasoline or light oil, and thereby output power. The engine 22 is under operation controls, such as fuel injection control, ignition control, and intake air flow control, of an engine electronic control unit (hereafter referred to as engine ECU) 24 that inputs diverse signals from various sensors, for example, a crank position from a non-illustrated crank positions sensor to detect the crank angle of the crankshaft 26, used to measure and detect the operating conditions of the engine 22. The engine ECU 24 establishes communication with the hybrid electronic control unit 70 to drive and control the engine 22 in response to control signals from the hybrid electronic control unit 70 and with reference to the diverse signals from the various sensors and to output data regarding the operating conditions of the engine 22 to the hybrid electronic control unit according to the requirements. The engine ECU 24 also computes a rotation speed of the crankshaft 26, which is equivalent to a rotation speed Ne of the engine 22, based on the non-illustrated crank position from the crank positions sensor.

The power distribution integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 39a and 39b via a gear mechanism 37 and a differential gear 38 from ring gear shaft 32a.

Both the motors MG1 and MG2 are known synchronous motor generators that are driven as a generator and as a motor. The motors MG1 and MG2 transmit electric power to and from the master battery 50 via the inverters 41 and 42 and the master side step-up circuit 55, and transmit electric power to and from the slave batteries 60 and 62 via the inverters 41 and 42 and the slave side step-up circuit 65. Power lines (hereafter referred to as high-voltage system power lines) 54 that connect the inverters 41 and 42 with the master side step-up circuit 55 and the slave side step-up circuit 65 are constructed as a positive electrode bus line and a negative electrode bus line shared by the inverters 41 and 42. This arrangement enables the electric power generated by one of the motors MG1 and MG2 to be consumed by the other motor. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements. The motor ECU 40 also performs arithmetic operations to compute rotation speeds Nm1 and Nm2 of the motors MG1 and MG2 from the output signals of the rotational position detection sensors 43 and 44.

Both the master side step-up circuit 55 and the slave side step-up circuit 65 are known step-up circuit. The master side step-up circuit 55 is connected to power lines (hereafter referred to as first low-voltage system power lines) 59 that are connected via the system main relay 56 to the master battery 50, and the above described high-voltage system power lines 54. The master side step-up circuit 55 steps up the voltage of electric power from the master battery 50 to supply the electric power to the inverters 41 and 42, and steps down the voltage of electric power applied to the inverters 41 and 42 to charge the master battery 50. The slave side step-up circuit 65 is connected to power lines (hereafter referred to as second low-voltage system power lines) 69 that are connected via the system main relay 66 to the slave battery 60 and via the system main relay 67 to the slave battery 62, and the high-voltage system power lines 54. The slave side step-up circuit 65 steps up the voltage of electric power from a slave battery (hereafter referred to as connection side slave battery) that is connected to the slave side step-up circuit 65 between the slave batteries 60 and 62 to supply the electric power to the inverters 41 and 42, and steps down the voltage of electric power applied to the inverters 41 and 42 to charge the connection side slave battery. A smoothing capacitor 57 is connected to the positive electrode bus line and negative electrode bus line of the high-voltage system power lines 54, a smoothing capacitor 58 is connected to the positive electrode bus line and negative electrode bus line of the first low-voltage system power lines 59, and a smoothing capacitor 68 is connected to the positive electrode bus line and negative electrode bus line of the second low-voltage system power lines 69.

Figure 2:
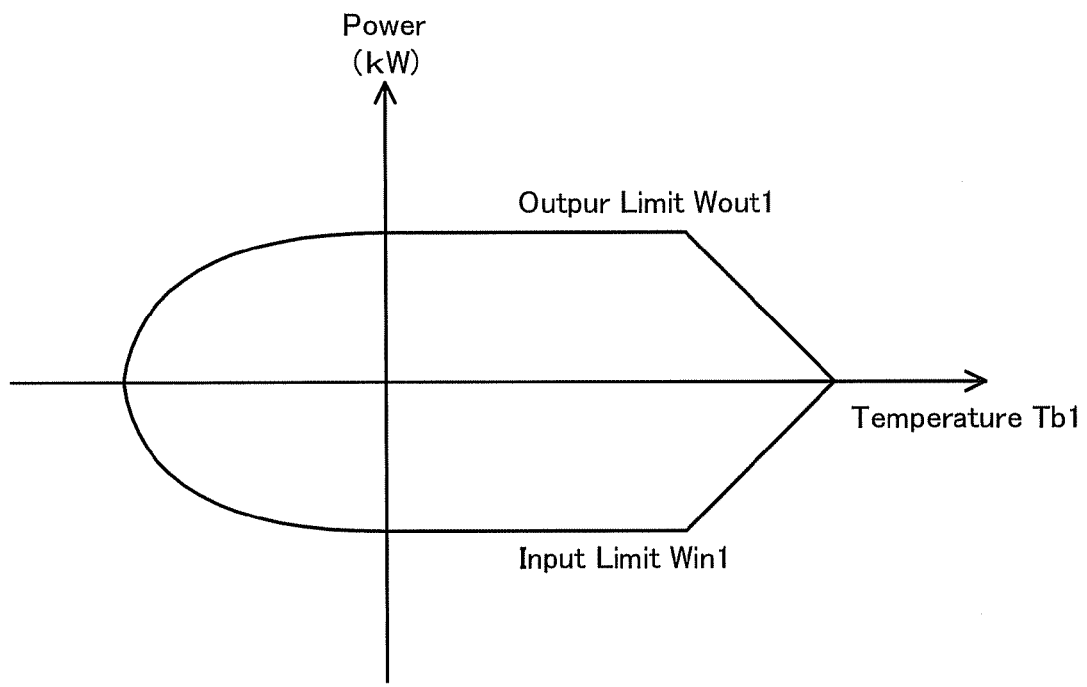
FIG. 2 shows variations of an input limit Win1 and an output limit Wout1 against a battery temperature Tb1 of the master battery 50.
Figure 3:
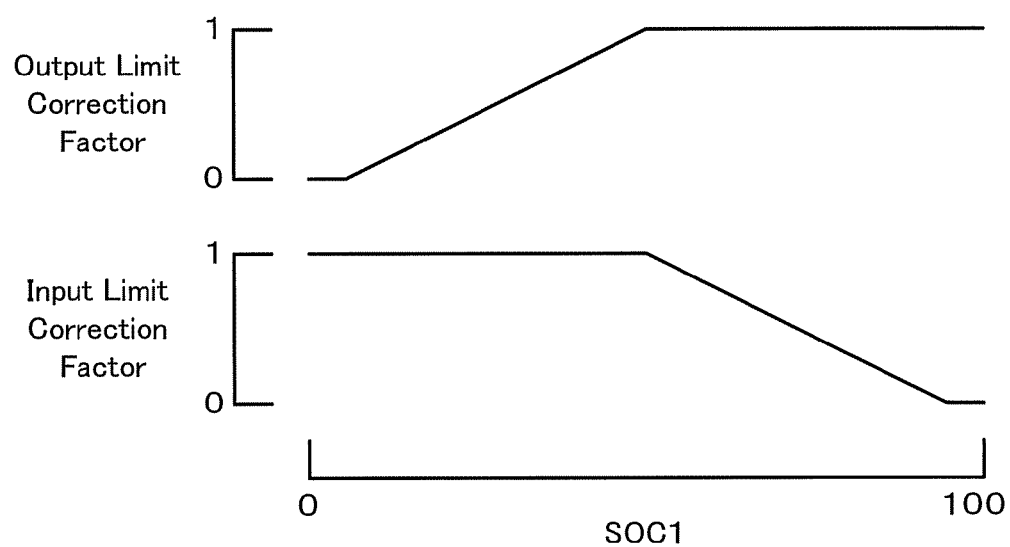
FIG. 3 shows variations of correction factors of the input limit Win1 and the output limit Wout1 against an accumulated charge amount SOC1 of the master battery 50.

All of the master battery 50 and the slave batteries 60 and 62 are constructed as lithium-ion secondary batteries, and are under control of a battery electronic control unit (hereafter referred to as battery ECU) 52. The battery ECU 52 receives diverse signals required for control of the master battery 50 and the slave batteries 60 and 62, for example, an inter-terminal voltage Vb1 measured by a voltage sensor disposed between terminals of the master battery 50, a charge-discharge current Ib1 measured by a current sensor attached to an output terminal at the positive pole side of the master battery 50, a battery temperature Tb1 measured by a temperature sensor 51 attached to the master battery 50, inter-terminal voltages Vb2 and Vb3 measured by voltage sensors disposed respectively between terminals of the slave batteries 60 and 62, charge-discharge currents Ib2 and Ib3 measured by current sensors attached respectively to output terminals at the positive pole side of the slave batteries 60 and 62, and a battery temperature Tb2 and Tb3 measured by temperature sensors 61 and 63 attached respectively to the slave batteries 60 and 62. The battery ECU 52 outputs data relating to each state of the master battery 50 and the slave batteries 60 and 62 to the hybrid electronic control unit 70 via communication according to the requirements. The battery ECU 52 performs various arithmetic operations for management and control of the master battery 50. An accumulated charge amount SOC1 of the master battery 50 is calculated from an integrated value of the charge-discharge current Ib1 measured by the current sensor. An input limit Win1 as a maximum allowable charging electric power to be charged in the master battery 50 and an output limit Wout1 as a maximum allowable discharging electric power to be discharged from the master battery 50 are set corresponding to the calculated accumulated charge amount SOC1 and the battery temperature Tb1. The battery ECU 52 performs various arithmetic operations for management and control of the slave batteries 60 and 62. Accumulated charge amounts SOC2 and SOC3 of the slave batteries 60 and 62 are calculated from integrated values of the charge-discharge currents Ib2 and Ib3 measured by the current sensors. Input limits Win2 and Win3 as allowable charging electric powers to be charged in the slave batteries 60 and 62 and output limits Wout2 and Wout3 as allowable discharging electric powers to be discharged from the slave batteries 60 and 62 are set corresponding to the calculated accumulated charge amounts SOC2 and SOC3 and the battery temperature Tb2 and Tb3. A concrete procedure of setting the input and output limits Win1 and Wout1 of the master battery 50 sets base values of the input limit Win1 and the output limit Wout1 corresponding to the battery temperature Tb1, specifies an input limit correction factor and an output limit correction factor corresponding to the accumulated charge amount SOC1 of the master battery 50, and multiplies the base values of the input limit Win1 and the output limit Wout1 by the specified input limit correction factor and output limit correction factor to determine the input limit Win1 and the output limit Wout1 of the master battery 50. FIG. 2 shows variations of the input limit Win1 and the output limit Wout1 against battery temperature Tb1 of the master battery 50. FIG. 3 shows variations of correction factors of the input limit Win1 and the output limit Wout1 against accumulated charge amount SOC1 of the master battery 50. The input and output limits Win2 and Wout2 of the slave battery 60 and the input and output limits Win3 and Wout3 of the slave battery 62 are set as well as the input and output limits Win1 and Wout1 of the master battery 50.

A charger 90 is connected to the second low-voltage system in parallel with the slave batteries 60 and 62 against the slave side step-up circuit 65, and a vehicle side connector 92 is connected to the charger 90. The vehicle side connector 92 is constructed capable of connecting an external power supply side connector 102 connected to an external power supply of AC (for example, domestic power supply (AC 100V)) 100 that is a power supply at the outside of the vehicle. The charger 90 includes a charging relay that makes connection and disconnection between the second low-voltage system and the vehicle side connector 92, an AC-to-DC converter that converts AC power from the external power supply 100 to DC power, and a DC-to-DC converter that regulates the voltage of the DC power converted by the AC-to-DC converter to supply the power to the second low-voltage system.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: a voltage (voltage of the high-voltage system) VH measured by a voltage sensor 57a disposed between terminals of the condenser 57, a voltage (voltage of the first low-voltage system) VH1 measured by a voltage sensor 58a disposed between terminals of the condenser 58, a voltage (voltage of the second low-voltage system) VH2 measured by a voltage sensor 68a disposed between terminals of the condenser 68, an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, a vehicle speed V from a vehicle speed sensor 88, and an switch signal SW from a motor travel priority cancellation switch 89 that instructs cancellation of a priority to motor travel between the motor travel where the hybrid vehicle 20 is driven only with input and output power to and from the motor MG2 and hybrid travel where the hybrid vehicle 20 is driven with output power from the engine 22. The hybrid electronic control unit 70 outputs various signals via the output port: switching control signals to switching elements of the master side step-up circuit 55, switching control signals to switching elements of the slave side step-up circuit 65, driving signals to the system main relays 56, 66 and 67, control signals to the charger 90. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously. In the hybrid vehicle 20 of the embodiment, the gearshift position SP detected by the gearshift position sensor 82 has multiple different options: parking position (P position), neutral position (N position), drive position (D position), and reverse position (R position).

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of the accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging any of the master battery 50 and the slave batteries 60 and 62 or supplied by discharging any of the master battery 50 and the slave batteries 60 and 62, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of any of the master battery 50 and the slave batteries 60 and 62. The motor drive mode stops the operations of the engine 22 and drives and controls the motor MG2 to output a quantity of power equivalent to the required level of power to the ring gear shaft 32a. For convenience of explanation, the hybrid vehicle 20 being driven only with input and output power to and from the motor MG2 is described as the motor travel, and the hybrid vehicle 20 being driven with output power from the engine 22 is described as the hybrid travel hereafter.

In the hybrid vehicle 20 of the embodiment, upon connection between the external power supply side connector 102 and the vehicle side connector 92 after system shutdown of the hybrid vehicle 20 at home or at a predetermined charging point, the charging relay in the charger 90 is switched to on. The master battery 50 and the slave batteries 60 and 62 are then brought to each fully charged state or a preset charge state that is less charged state than the fully charged state (for example, each state of the accumulated charge amounts SOC1, SOC2, and SOC3 equal to 80% or 85%), by switching on the system main relays 56, 66 and 67 and controlling the AC-to-DC converter and DC-to-DC converter in the charger 90. When the system of the hybrid vehicle 20 is started up (by ignition on) with the state of the master battery 50 and the slave batteries 60 and 62 being charged enough as described and vehicle travelling is started, it is enabled to drive the hybrid vehicle 20 for some extent of distance (time) with the motor travel using electric power from the master battery 50 and the slave batteries 60 and 62. In the hybrid vehicle 20 of the embodiment, the slave batteries 60 and 62 are included in addition to the master battery 50, and it is thus enabled to have a longer travelling distance (travelling time) for driving the hybrid vehicle 20 with the motor travel in comparison with a vehicle only including the master battery 50.

In the hybrid vehicle 20 of the embodiment, when the system of the hybrid vehicle 20 is started up (by ignition on) with a state where the master battery 50 and the slave batteries 60 and 62 being charged enough with electric power from a external power supply 100, the master battery 50 and the master side step-up circuit 55 are connected by the system main relay 56 being switched to on and the slave battery 60 and the slave side step-up circuit 65 are connected by the system main relay 66 being switched to on (hereafter referred to as a first connection state). The hybrid vehicle 20 is driven with a priority to the motor travel between the motor travel where the hybrid vehicle 20 is driven only with input and output power to and from the motor MG2 and the hybrid travel where the hybrid vehicle 20 is driven with output power from the engine 22 while the master side step-up circuit 55 and the slave side step-up circuit 65 being controlled so that the accumulated charge amount SOC2 of the slave battery 60 decreases faster than the accumulated charge amount SOC1 of the master battery 50. When the accumulated charge amount SOC2 of the slave battery 60 becomes less than or equal to a preset value Sref2 (for example, 25%, 30% or 35%), the slave battery 62 and the slave side step-up circuit 65 are connected by the system main relay 67 being switched to on after the slave battery 60 and the slave side step-up circuit 65 are disconnected by the system main relay 66 being switched to off (hereafter referred to as a second connection state). Then, the hybrid vehicle 20 is driven with a priority to the motor travel while the master side step-up circuit 55 and the slave side step-up circuit 65 being controlled so that the accumulated charge amount SOC1 of the master battery 50 becomes less than or equal to a preset value Sref1 (for example, 30%, 35% or 40%) and the accumulated charge amount SOC3 of the slave battery 62 becomes less than or equal to a preset value Sref3 (for example, 25%, 30% or 35%). When the accumulated charge amount SOC1 of the master battery 50 becomes less than or equal to the preset value Sref1 and the accumulated charge amount SOC3 of the slave battery 62 becomes less than or equal to the preset value Sref3, the slave battery 62 is disconnected from the slave side step-up circuit 65 by the system main relay 67 being switched to off. Then, the hybrid vehicle 20 is driven with an intermittent operation of the engine 22 based on a power demand required for the hybrid vehicle 20. For convenience of explanation, a state where both the system main relays 66 and 67 are off while changing from the first connection state to the second connection state or a state where the system main relay 67 is switched to off because the accumulated charge amount SOC1 of the battery 50 becomes less than or equal to the preset value Sref1 and the accumulated charge amount SOC3 of the slave battery 62 becomes less than or equal to the preset value Sref3 are described as a slave shutoff state hereafter. The first connection state is the state where the master battery 50 and the master side step-up circuit 55 are connected, the slave battery 60 and the slave side step-up circuit 65 are connected and the slave battery 62 and the slave side step-up circuit 65 are disconnected. The second connection state is the state that the master battery 50 and the master side step-up circuit 55 are connected, the slave battery 62 and the slave side step-up circuit 65 are connected and the slave battery 60 and the slave side step-up circuit 65 are disconnected. The slave shutoff state is the state that the master battery 50 and the master side step-up circuit 55 are connected and both the slave batteries 60 and 62 are disconnected from the slave side step-up circuit 65.

Figure 4:
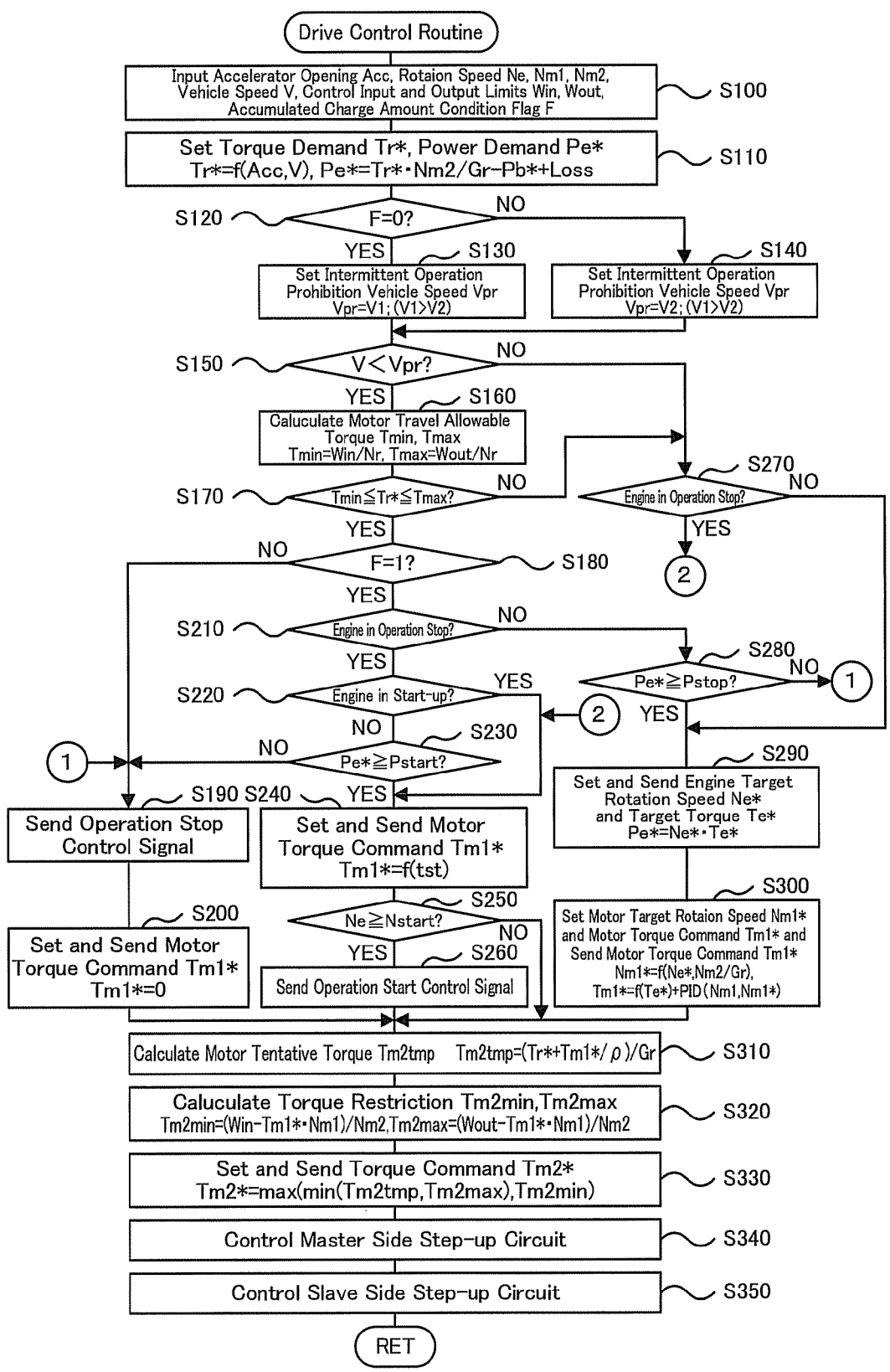
FIG. 4 is a flowchart showing a drive control routine executed by the hybrid electronic control unit 70.
Figure 5:
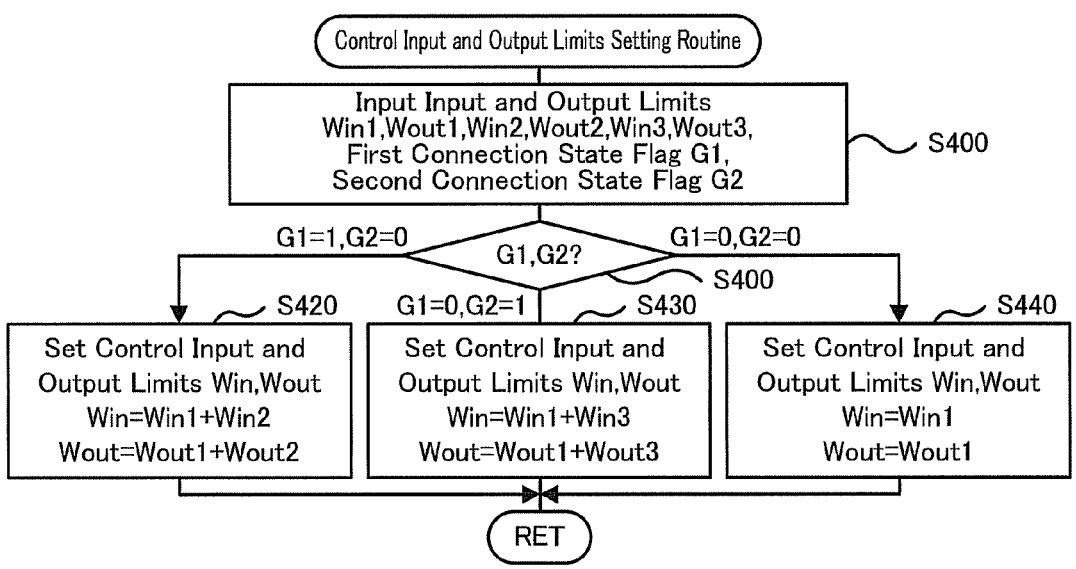
FIG. 5 is a flowchart showing a control input and output limits setting routine by hybrid electronic control unit 70.

The description regards the operations of the hybrid vehicle 20 of the embodiment having the configuration discussed above, especially the operations to be driven after the system of the hybrid vehicle 20 is started up with the state where the master battery 50 and the slave batteries 60 and 62 being charged enough with electric power from the external power supply 100. FIG. 4 is a flowchart showing a drive control routine executed by the hybrid electronic control unit 70. FIG. 5 is a flowchart showing a control input and output limits setting routine for setting control input and output limits Win and Wout (the values that is set based on each state of the master battery 50 and the slave batteries 60 and 62 and each on/off state of the system main relays 56, 66 and 67). The drive control routine and the control input and output limits setting routine are performed repeatedly at preset time intervals (for example, at every several msec). The hybrid electronic control unit 70 executes on-off control. As the on-off control, the hybrid electronic control unit 70 switches the system main relays 56 and 66 to on when the system of the hybrid vehicle 20 is started up with the state where the master battery 50 and the slave batteries 60 and 62 being charged enough with electric power from the external power supply 100, after then, parallel to the drive control routine of FIG. 4 and the control input and output limits setting routine of FIG. 5, switches the system main relay 67 to on after switching the system main relay 66 to off when the accumulated charge amount SOC2 becomes less than or equal to the preset value Sref2, and switches the system main relay 67 to off when the accumulated charge amount SOC1 of the master battery 50 becomes less than or equal to the preset value Sref1 and the accumulated charge amount SOC3 of the slave battery 62 becomes less than or equal to the preset value Sref3. Hereafter, for convenience of explanation, a setting process of control input and output limits Win and Wout is described first referring to the control input and output limits setting routine of FIG. 5, and a drive control is described next referring to the drive control routine of FIG. 4.

In the control input and output limits setting routine, the CPU 72 of the hybrid electronic control unit 70 inputs various data, for example, the input limit Win1 and output limit Wout1 of the master battery 50, the input limit Win2 and output limit Wout2 of the slave battery 60, the input limit Win3 and the output limit Wout3 of the slave battery 62, a first connection state flag G1 that is set to value '1' when a state of the hybrid vehicle 20 is the first connection state (where the system main relays 56 and 66 are on and the system main relay 67 is off) and set to value '1' when the state of the hybrid vehicle 20 is not the first connection state, a second connection state flag G2 that is set to value '1' when the state of the hybrid vehicle 20 is the second connection state (where the system main relays 56 and 67 are on and the system main relay 66 is off) and to value '0' when the state of the hybrid vehicle 20 is not the second connection state (step 400). The input limit Win1 and the output limit Wout1 are set based on the battery temperature Tb1 and the accumulated charge amount SOC1 of the master battery 50 and are input from the battery ECU 52 by communication. The input limit Win2 and the output limit Wout2 are set based on the battery temperature Tb2 and the accumulated charge amount SOC2 of the slave battery 60 and are input from the battery ECU 52 by communication. The input limit Win3 and the output limit Wout3 are set based on the battery temperature Tb3 and the accumulated charge amount SOC3 of the slave battery 62 and are input from the battery ECU 52 by communication.

After the data input, the CPU 72 checks the value of the input first connection state flag G1 and the value of the input second connection state flag G2 (steps S410). When the value of the first connection state G1 is value '1' and the value of the second connection state G2 is value '0', it is decided that the state of the hybrid vehicle 20 is the first connection state, and the sum of the input limit Win1 of the master battery 50 and the input limit Win2 of the slave battery 60 is set as the control input limit Win and the sum of the output limit Wout1 of the master battery 50 and the output limit Wout2 of the slave battery 60 is set as the control input limit Wout (step S420). When the value of the first connection state G1 is value '0' and the value of the second connection state G2 is value '1', it is decided that the state of the hybrid vehicle 20 is the second connection state, and the sum of the input limit Win1 of the master battery 50 and the input limit Win3 of the slave battery 62 is set as the control input limit Win and the sum of the output limit Wout1 of the master battery 50 and the output limit Wout3 of the slave battery 62 is set as the control input limit Wout (step S430). When the value of the first connection state G1 is value '0' and the value of the second connection state G2 is value '0', it is decided that the state of the hybrid vehicle 20 is the slave shutoff state, and the input limit Win1 of the master battery 50 is set as the control input limit Win and the output limit Wout1 of the master battery 50 is set as the control input limit Wout (step S440). The control input and outputs limits setting routine is then terminated. That is to say, at the first connection state or the second connection state, the control input limit Win and the control output limit Wout are set to larger values in absolute than at the slave shutoff state.

The following description regards the drive control using the control input limit Win and the control output limit Wout set as described above. In the drive control routine, the CPU 72 of the hybrid electronic control unit 70 inputs various data required for drive control, for example, the accelerator opening Acc from the accelerator pedal position sensor 84, the vehicle speed V from the vehicle speed sensor 88, the rotation speed Ne of the engine 22, the rotation speeds Nm1 and Nm2 of the motors MG1 and MG2, the control input limit Win, the control output limit Wout, an accumulated charge condition flag F that shows whether an accumulated charge condition is satisfied (step S100). The accumulate charge condition is a condition that is satisfied when the accumulated charge amount SOC1 of the master battery 50 becomes less than or equal to the preset value Sref1, the accumulated charge amount SOC2 of the slave battery 60 becomes less than or equal to the preset value Sref2 and the accumulated charge amount SOC3 of the slave battery 62 becomes less than or equal to the preset value Sref3. The rotation speed Ne of the engine 22 is computed from the crank position detected by the non-illustrated crank position sensor and is input from the engine ECU 24 by communication. The rotation speeds Nm1 and Nm2 of the motors MG1 and MG2 are computed from the rotational positions of the rotors in the motors MG1 and MG2 detected by the rotational position detection sensors 43 and 44 and are input from the motor ECU 40 by communication. The control input limit Win and the control output limit Wout are set by the control input and output limits setting routine of FIG. 5 described above and are input. The accumulated charge amount condition flag F is set to value '0' before the accumulated charge amount condition is satisfied after the system of the hybrid vehicle 20 is started up, while being set to value '1' after the accumulated charge amount condition is satisfied.

Figure 6:
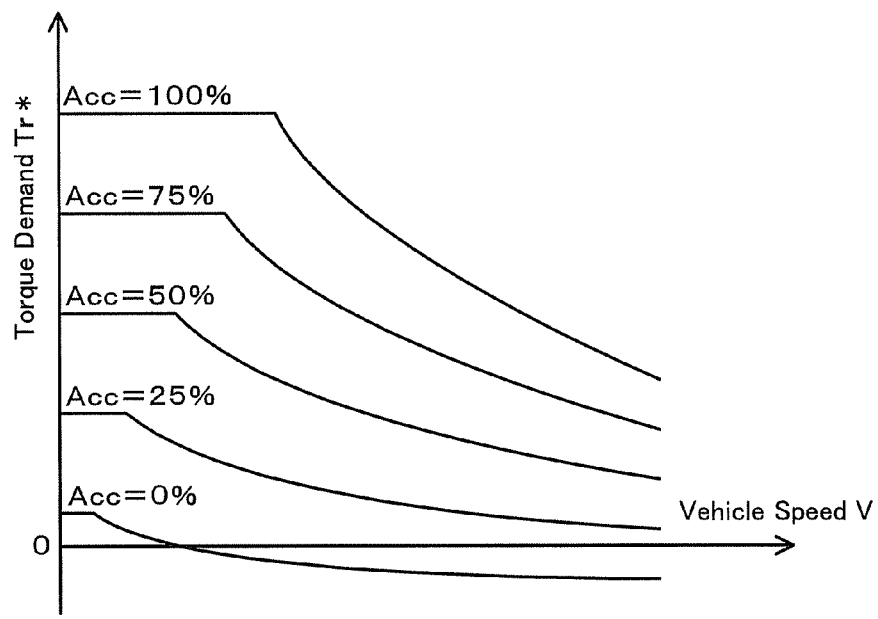
FIG. 6 shows one example of the torque demand setting map.

After the data input, the CPU 72 sets a torque demand Tr* to be output to the ring gear shaft 32a or the driveshaft linked with the drive wheels 39a and 39b as a torque required for the hybrid vehicle 20 and a power demand Pe* required for the hybrid vehicle 20 based on the input accelerator opening Acc and the input vehicle speed V (step Silo). A concrete procedure of setting the torque demand Tr* in this embodiment provides and stores in advance variations in torque demand Tr* against the vehicle speed V with regard to various settings of the accelerator opening Acc as a torque demand setting map in the ROM 74 and reads the torque demand Tr* corresponding to the given accelerator opening Acc and the given vehicle speed V from this torque demand setting map. One example of the torque demand setting map is shown in FIG. 6. The power demand Pe* is calculated as a value in which a charge-discharge power demand Pb* required for the master battery 50 and the slave batteries 60 and 62 is subtracted from the product of the set torque demand Tr* and a rotation speed Nr of the ring gear shaft 32a, and potential loss Loss is added. The charge-discharge power demand Pb* is set to positive value at the discharge side of the batteries and set to negative value at the charge side of the batteries. The rotation speed Nr of the ring gear shaft 32a is obtained by multiplying the vehicle speed V by a preset conversion factor k (Nr=k·V) or by dividing the rotation speed Nm2 of the motor MG2 by a gear ratio Gr of the reduction gear 35 (Nr=Nm2/Gr). The charge-discharge power demand Pb* is set based on the accumulated charge amount SOC1 of the master battery 50 and the accumulated charge amount of the connection side slave battery (one slave battery currently connected to the slave side step-up circuit 65 between slave batteries 60 and 62).

The CPU 72 subsequently checks the value of the accumulated charge amount condition flag F (step S120). When the accumulated charge amount condition flag F is value '0', it is decided that the checked timing is a timing that is prior to the satisfaction of the accumulated charge amount condition. The CPU 72 sets a vehicle speed V1 (for example, 100 km/h or 110 km/h) that is relatively high, as an intermittent operation prohibition vehicle speed Vpr for prohibiting an intermittent operation of the engine 22 (step S130). When the accumulated charge amount condition flag F is value '1', it is decided that checked timing is a timing that is subsequent to the satisfaction of the accumulated charge amount condition. The CPU 72 sets a vehicle speed V2 (for example, 70 km/h or 75 km/h) that is less than the vehicle speed V1, as the intermittent operation prohibition vehicle speed Vpr (step S140). That is to say, before the accumulated charge amount condition is satisfied, the vehicle speed V1 that is higher than after the accumulated charge amount condition is satisfied is set as the intermittent operation prohibition vehicle speed Vpr.

The CPU 72 compares the vehicle speed V with the intermittent operation prohibition speed Vpr (step S150). When the vehicle speed V is less than the intermittent operation prohibition speed Vpr, it is decided that the intermittent operation of the engine 22 is not prohibited. The CPU 72 calculates a lower motor travel allowable torque Tmin and an upper motor travel allowable torque Tmax as capable minimum and maximum torque output from the motor MG2 to ring gear shaft 32a or the driveshaft in the case the hybrid vehicle 20 is driven in the motor travel according to Equations (1) and (2) given below (step S160). The lower motor travel allowable torque Tmin and the upper motor travel allowable torque Tmax are obtained by dividing the control input Limit Win or the control output limit Wout by the rotation speed Nr of the ring gear shaft 32a. As described above, at the first connection state or the second connection state, the control input limit Win and the control output limit Wout are set to larger values in absolute than at the slave shutoff state. Therefore, at the first connection state or the second connection state, the lower motor travel allowable torque Tmin and the upper travel allowable torque Tmax are also set to larger values in absolute than at the slave shutoff state.

$$Tmin = Win/Nr \quad (1)$$

$$Tmax = Wout/Nr \quad (2)$$

The CPU 72 next determines whether the set torque demand Tr* is within a range of the lower motor travel allowable torque Tmin and the upper motor travel allowable torque Tmax (step S170). In this procedure, the CPU 72 determines whether the torque demand Tr* enables to be covered only by a torque that is input from the ring gear shaft 32a to the motor MG2 or output from the motor MG2 to the ring gear shaft 32a or not (the motor travel is allowable or not). Upon determination that the torque demand Tr* is within the range of the lower motor travel allowable torque Tmin and the upper motor travel allowable torque Tmax, it is decided that the torque demand Tr* enables to be covered only by a torque that is input and output to and from the motor MG2 from and to ring gear shaft 32a. The CPU 72 checks the value of the accumulated charge condition flag F (step S180). When the value of the accumulated charge amount condition flag F is value '0', it is decided that checked timing is that timing that is prior to the satisfaction of the accumulated charge amount condition and that there is a requirement for stopping the operation of the engine 22. The CPU 72 sends a control signal (an operation stop signal) for stopping the operation of the engine 22 by stopping the fuel injection control and ignition control (step S190). The CPU 72 sets the torque command Tm1* of the motor MG1 to value '0' and sends the setting of the torque command Tm1* to the motor ECU 40 (step S200). In response to reception of the operation stop signal, the engine ECU 24 keeps an operation stop state of the engine 22 when the engine 22 is in operation stop, and stops the operation of the engine 22 when the engine 22 is in operation. In response to reception of the setting of the torque command Tm1*, the motor ECU 40 performs switching control of the switching elements in the inverter 41 to drive the motor MG1 with the torque command Tm1* (in this case, value '0').

Figure 7:
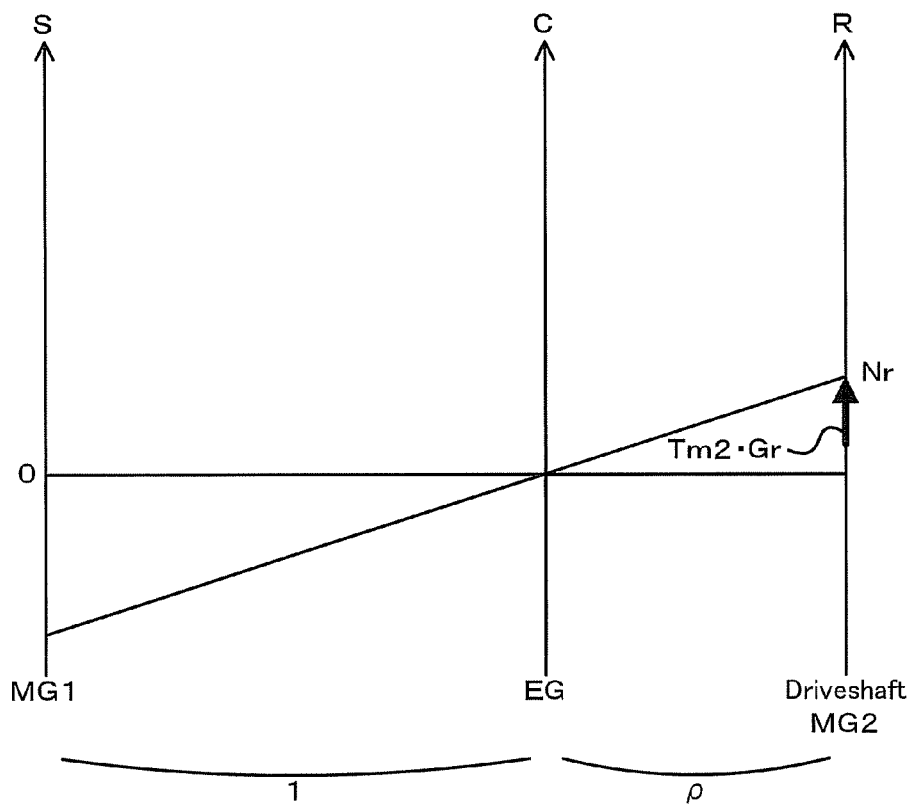
FIG. 7 is an alignment chart showing torque-rotation speed dynamics of respective rotational elements included in a power distribution integration mechanism 30 during drive of the hybrid vehicle 20 in operation stop of an engine 22.

The CPU 72 subsequently adds the result of division of the torque command Tm1* by the gear ratio ρ of the power distribution integration mechanism 30 to the torque demand Tr*, and specifies a tentative torque Tm2*tmp* as a provisional value of torque to be output from the motor MG2 by dividing the result of the addition by the gear ratio Gr of the reduction gear 35, according to Equation (3) given below (step S310). The CPU 72 subsequently calculates a lower torque restriction Tm2*min* and an upper torque restriction Tm2*max* as allowable minimum and maximum torques output from the motor MG2 according to Equations (4) and (5) given below (step S320). The lower torque restriction Tm2*min* and the upper torque restriction Tm2*max* are obtained by dividing respective differences between the control input limit Win or the control output limit Wout and power consumption (power generation) of the motor MG1, which is the product of the calculated torque command Tm1* and the current rotation speed Nm1 of the motor MG1, by the current rotation speed Nm2 of the motor MG2. The CPU 72 then limits the specified tentative torque Tm2tmp by the lower torque restriction Tm2min and upper torque restriction Tm2max according to Equation (6) given below to set a torque command Tm2* of the motor MG2, and sends the setting of the torque command Tm2* to the motor ECU 40 (step S330). In response to reception of the setting of the torque command Tm2*, the motor ECU 40 performs switching control of the switching elements in the inverter 42 to drive the motor MG2 with the torque command Tm2*. FIG. 7 is an alignment chart showing torque-rotation speed dynamics of respective rotational elements included in the power distribution integration mechanism 30 during the drive of the hybrid vehicle 20 in operation stop of the engine 22. The left axis 'S' represents a rotation speed of the sun gear 31 that is equivalent to the rotation speed Nm1 of the motor MG1. The middle axis 'C' represents a rotation speed of the carrier 34 that is equivalent to the rotation speed Ne of the engine 22. The right axis 'R' represents the rotation speed Nr of the ring gear 32 obtained by dividing the rotation speed Nm2 of the motor MG2 by the gear ratio Gr of the reduction gear 35. Equation (3) is readily introduced from the alignment charge of the FIG. 7. In this case, the set torque command Tm1* is value '0', thus the lower torque restriction Tm2min and the upper torque restriction Tm2max are obtained by dividing the control input limit Win or the control output limit Wout by the rotation speed Nm2 of the motor MG2. In this case, the lower torque restriction Tm2min and the upper torque restriction Tm2max are equal to division the motor travel allowable torque Tmin or the motor travel allowable torque Tmax obtained by Equation (1) or (2), by the gear ratio Gr of the reduction gear 35. In consideration of the current condition where the torque demand Tr* is within the range of the lower motor travel allowable torque Tmin and the upper motor travel allowable torque Tmax, the tentative torque Tm2tmp is within the lower torque restriction Tm2min and the upper torque restriction Tm2max. Therefore, such control enables the torque demand Tr* to be output from the motor MG2 to the ring gear shaft 32a for driving the hybrid vehicle 20. That is to say, when the torque demand Tr* is within the range of the lower motor travel allowable torque Tmin and the upper motor travel allowable torque Tmax in the case the vehicle speed V is less than the intermittent operation prohibition vehicle speed Vpr before the accumulated charge amount condition is satisfied, such control enables the torque demand Tr* to be output from the motor MG2 to the ring gear shaft 32a for driving the hybrid vehicle 20 in operation stop of the engine 22, regardless of the power demand Pe*.

$$Tm2tmp=(Tr^*+Tm1^*/\rho)/Gr \quad (3)$$

$$Tm2min=(win-Tm1^*\cdot Nm1)/Nm2 \quad (4)$$

$$Tm2max=(wout-Tm1^*\cdot Nm1)/Nm2 \quad (5)$$

$$Tm2^*=max(min(Tm2tmp,Tm2max),Tm2min) \quad (6)$$

The CPU 72 controls the master side step-up circuit 55 so that the voltage VH of the high-voltage system becomes the target voltage VH* (step S340), and controls the slave side step-up circuit 65 so that electric power Pbs supplied from the connection side slave battery (one slave battery currently connected to the slave side step-up circuit 65 between the slave batteries 60 and 62) to the side of the inverters 41 and 42 becomes a target charge-discharge power Pbs* (step S350). The drive control routine is then terminated. In this embodiment, the voltage VH of the high-voltage system is input from the voltage sensor 57a, and the target voltage VH* is set to a larger one between a voltage corresponding to the target operation point (the torque command Tm1*, the rotation speed Nm1) of the motor MG1 and a voltage corresponding to the target operation point (the torque command Tm2*, the rotation speed Nm2). In this embodiment, electric power Pbs from the connection side slave battery is calculated as the product of a terminal voltage measured by voltage sensor corresponding to the connection side slave battery and a charge-discharge current measured by a current sensor corresponding to the connection side slave battery, and is input from the battery ECU 52 by communication. The target charge-discharge power Pbs* is set as electric power to be supplied from the connection side slave battery to high-voltage system against power consumption Pm (=Tm1*·Nm1+Tm2*·Nm2) in the motors MG1 and MG2. At the first connection state, the target discharge power Pbs* is set from a ratio R1 and the power consumption Pm in the motors MG1 and MG2. The ratio R1 is obtained based on difference ΔSOC1 (SOC1−Sref1) between the accumulated charge amount SOC1 of the master battery 50 and the preset value Sref1, difference ΔSOC2 (SOC2−Sref2) between the accumulated charge amount SOC2 of the slave battery 60 and the preset value Sref2 and difference ΔSOC3 (SOC3−Sref3) between the accumulated charge amount SOC3 of the slave battery 62 and the preset value Sref3, according to Equation (7) given below. At the second state, the target discharge power Pbs* is set from a ratio R2 and the power consumption Pm in the motors MG1 and MG2. The ratio R2 is obtained based on the difference ΔSOC1 and the difference ΔSOC3 according to Equation (8) given below. At the slave shutoff state, drive of the slave side step-up circuit 65 is stopped.

$$R1=(\Delta SOC2+\Delta SOC3)/(\Delta SOC1+\Delta SOC2+\Delta SOC3) \quad (7)$$

$$R2=\Delta SOC3/(\Delta SOC1+\Delta SOC3) \quad (8)$$

When the accumulated charge amount condition flag F is value '1' at step S180, it is decided that the checked timing is the timing that is subsequent to the satisfaction of the accumulated charge amount condition. The CPU 72 determines whether the engine 22 is in operation stop (step S210). Upon determination that the engine 22 is in operation stop, the CPU 72 determines whether the engine 22 is in a start-up state (step S220), and compares the power demand Pe* with a reference value Pstart used as a criterion for starting the engine 22 (step S230). The reference value Pstart is set closed to a lower limit value in a power range of ensuring relatively efficient operation of the engine 22. In a case that the engine 22 is not in the start-up state and that the power demand Pe* is less than the reference value Pstart, it is decided that there is a requirement for keeping the operation of the engine 22. The processing of and after step S190 is then executed as described above. The drive control routine is terminated.

Figure 8:
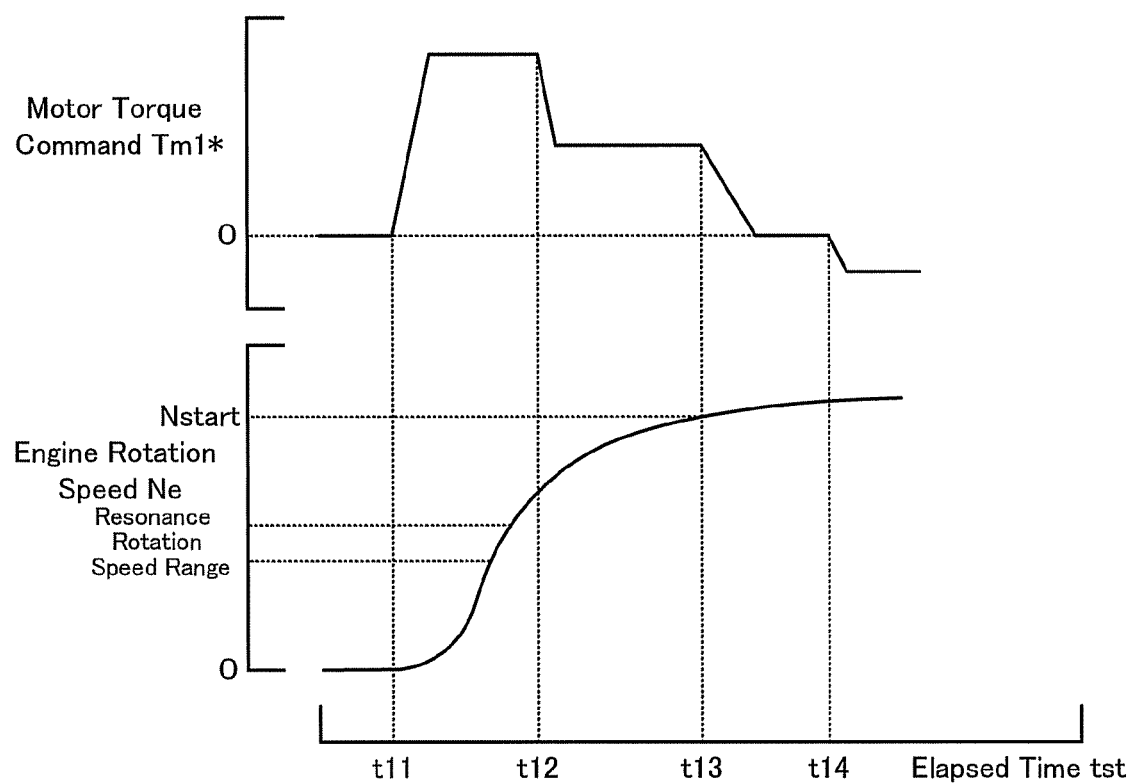
FIG. 8 shows one example of a torque setting map to set the torque command Tm1* of the motor MG1 for starting-up the engine 22 and one example of variations in the rotation speed Ne of the engine 22.

When it is determined at step S210 that the engine 22 is in operation stop and also determined at step S220 that the engine 22 is not in the start-up state, and further, when it is determined at step S230 that power demand Pe* is more than the reference value Pstart, it is decided that there is a requirement for starting up the engine 22. The CPU 72 sets the torque command Tm1* of the motor MG1 based on a torque setting map for start-up and an elapsed time tst since the beginning of the starting operation of the engine 22, and sends the setting of the torque command Tm1* to the motor ECU 40 (step S240). FIG. 8 shows one example of a torque setting map to set the torque command Tm1* of the motor MG1 for starting-up the engine 22 and one example of variations in the rotation speed Ne of the engine 22. In the torque setting map in this embodiment, immediately after a time point t11 when the starting instruction of the engine 22 is given, the rating process is performed to promptly increase the torque command Tm1* to a relatively large torque and thereby quickly increase the rotation speed Ne of the engine 22. At a time point t12 after the rotation speed Ne of the engine 22 has passed through a resonance rotation speed range or after a required time period for allowing the rotation speed Ne of the engine 22 to pass through the resonance rotation speed range has elapsed since the time point t11, a sufficient torque for stably motoring the engine 22 at a rotation speed of not lower than a preset rotation speed Nstart is set to the torque command Tm1*, in order to reduce the power consumption and the reactive torque at the ring gear shaft 32a or the driveshaft. At a time point t13 when the rotation speed Ne of the engine 22 has reached the preset rotation speed Nstart, the rating process is performed to promptly decrease the torque command Tm1* to 0. At a time point t14 when complete explosive consumption of the engine 22 is identified, a torque for power generation is set to the torque command Tm1*. In this embodiment, the preset rotation speed Nstart is a rotation speed for starting the fuel injection control and the ignition control of the engine 22.

The CPU 72 subsequently compares the rotation speed Ne of the engine 22 with the preset rotation speed Nstart (step S250). In consideration of the current condition of the beginning of the starting operation of the engine 22, the rotation speed Ne of the engine 22 is small and has not reached to the preset rotation speed Nstart. Therefore, the CPU 72 executes the processing of and after the step S310 without starting the fuel injection control and the ignition control of the engine 22, and exits from the drive control routine.

When the starting operation of the engine 22 is begun, it is determined at step 220 that the engine 22 is in the start-up state. The CPU 72 sets the torque command Tm1* of the motor MG1 based on the torque setting map for start-up and the elapsed time tst (step S240). When the rotation speed Ne of the engine 22 is less than the preset rotation speed Nstart (step S250), the CPU 72 executes the processing and after step S310 and exits from the drive control routine. When the rotation speed Ne is more than or equal to the preset rotation speed Nstart (step S250), the CPU 72 sends a control signal (operation start signal) for starting the fuel injection control and the ignition control of the engine 22 to engine ECU 24 (step S260), executes the processing and after step S310 and exits from the drive control routine. Such control starts up the engine 22 in operation stop, while enabling the hybrid vehicle 20 to be driven with output of the torque demand Tr* within the range of the control input limit Win and the control output limit Wout from the motor MG2 to the ring gear shaft 32a or the driveshaft.

When it is determined at step S210 that the engine 22 is in operation stop, that is, the engine 22 is in operation, the CPU 72 compares the power demand Pe* with a reference value Pstop used as a criterion for stopping the operation of the engine 22 (step S280). The reference value Pstop is set closed to a lower limit value in a power range of ensuring relatively efficient operation of the engine 22. In order to prevent frequent stops and starts of the engine 22, the reference value Pstop is preferably less than the reference value Pstart used as the criterion for starting the engine 22.

Figure 9:
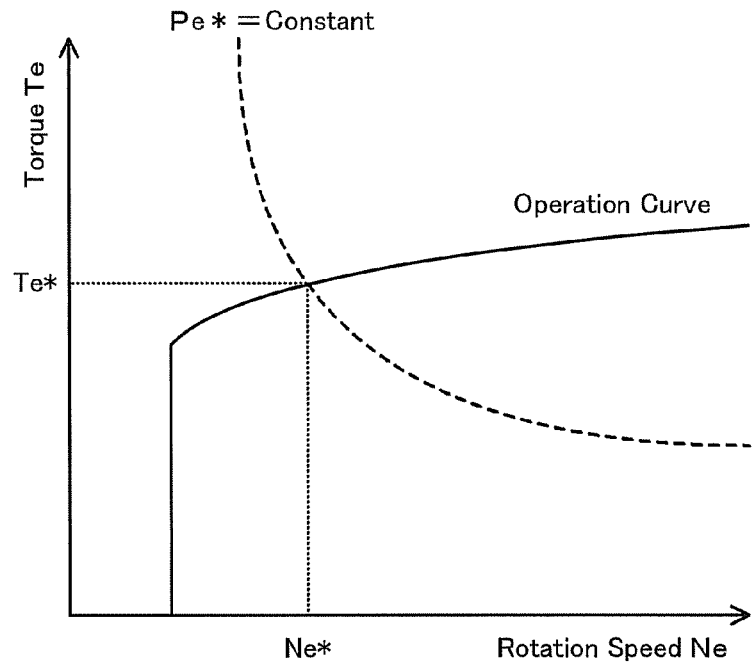
FIG. 9 shows an operation curve of the engine 22 used to set a target rotation speed Ne* and a target torque Te*.

When the power demand Pe* is more than or equal to the reference value Pstop, it is decided that there is a requirement for keeping the operation of the engine 22. The CPU 72 sets a target rotation speed Ne* and a target torque Te* defining a target drive point of the engine 22 based on the power demand Pe* and sends the settings of the target rotation speed Ne* and the set target torque Te* (step S290). The setting of the target rotation speed Ne* and the target torque Te* is performed based on an operation curve of the engine 22 to ensure efficient operation of the engine 22 and the power demand Pe*. FIG. 9 shows an operation curve of the engine 22 used to set the target rotation speed Ne* and the target torque Te*. As clearly shown in the figure, the target rotation speed Ne* and the target torque Te* are given as an intersection of the operation curve and a curve of constant power demand Pe* (=Ne*× Te*). In response to reception of the settings of the target rotation speed Ne* and the target torque Te*, the engine ECU 24 performs required controls including intake air flow regulation, ignition control, and fuel injection control of the engine 22 to drive the engine 22 at the specific drive point defined by the combination of the target rotation speed Ne* and the target torque Te*.

Figure 10:
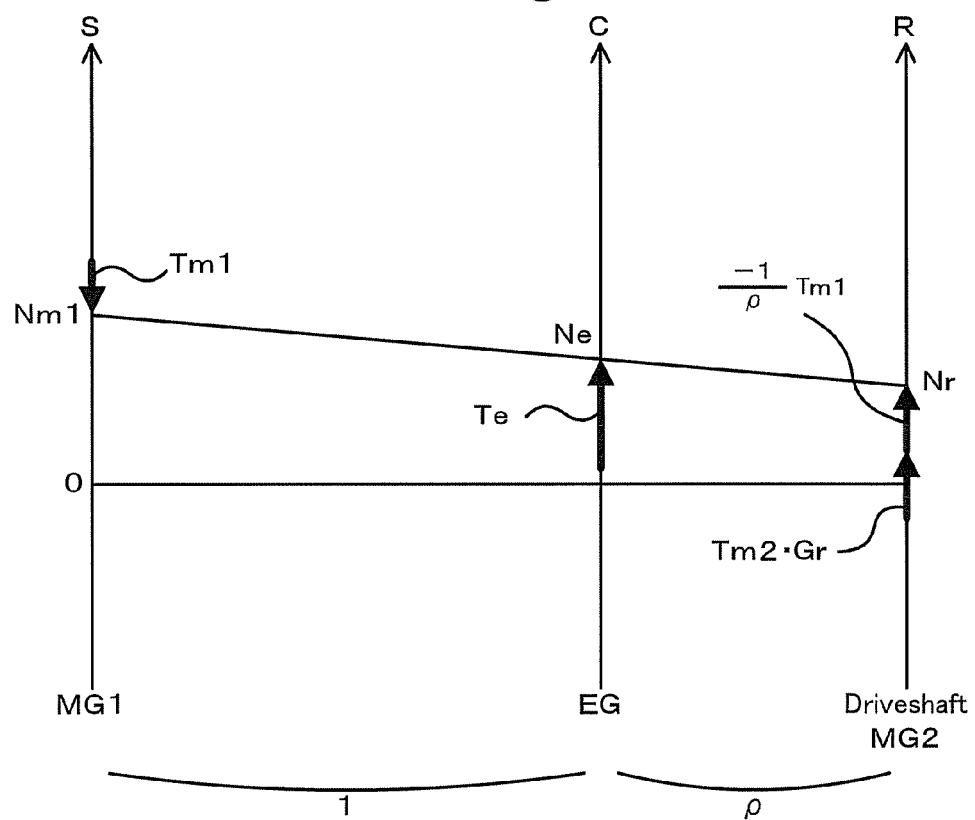
FIG. 10 is an alignment chart showing torque-rotation speed dynamics of the respective rotational elements included in the power distribution integration mechanism 30 during the drive of the hybrid vehicle 20 with output power from the engine 22.

The CPU 72 calculates a target rotation speed Nm1* of the motor MG1 from the target rotation speed Ne* of the engine 22, the rotation speed Nm2 of the motor MG2, the gear ratio ρ of the power distribution integration mechanism 30, and the gear ratio Gr of the reduction gear 35 according to Equation (9) given below, while calculating a torque command Tm1* of the motor MG1 from the calculated target rotation speed Nm1* and the current rotation speed Nm1 of the motor MG1, the target torque Te* of the engine 22, and the gear ratio ρ of the power distribution integration mechanism 30 according to Equation (10) given below and sending the setting of the torque command Tm1* (step S300). The CPU 72 executes the processing and after step S310 and exits from the drive control routine. FIG. 10 is an alignment chart showing torque-rotation speed dynamics of the respective rotational elements included in the power distribution integration mechanism 30 during the drive of the hybrid vehicle 20 with output power from the engine 22. Two thick arrows on the axis 'R' respectively show a torque applied to the ring gear shaft 32a by output of the torque Tm1 from the motor MG1, and a torque applied to the ring gear shaft 32a via the reduction gear 35 by output of the torque Tm2 from the motor MG2. Equation (9) is readily introduced from this alignment chart. In Equation (10), 'k1' in the second term and 'k2' in the third term on the right side denote a gain of the proportional and a gain of the integral term. Such control enables the torque demand Tr* within the range of the control input limit Win and the control output limit Wout to be output to the ring gear shaft 32a or the driveshaft for driving the hybrid vehicle 20 while operating the engine 22 efficiently.

$$Nm1^* = Ne^*(1+\rho)/\rho - Nm2/(Gr \cdot \rho) \quad (9)$$

$$Tm1^* = -\rho \cdot Te^*/(1+\rho) + k1(Nm1^* - Nm1) + k2\int(Nm1^* - Nm1)dt \quad (10)$$

When the power demand Pe* is less than the reference value Pstop at step S280, it is decided that there is a requirement for stopping the operation of the engine 22, the CPU executes the processing and after step S190 and then exits from the drive control routine.

Upon determination that the torque demand Tr* is out of the range of the lower motor travel allowable torque Tmin and the upper motor travel allowable torque Tmax at step S170, it is decided that the torque demand Tr* does not enable to be covered only by a torque that is input and output to and from the motor MG2 from and to ring gear shaft 32a. The CPU 72 determines whether the engine 22 is in operation stop (step S270). When it is determined that the engine 22 is not in operation stop, that is, the engine 22 is in operation, the CPU 72 decides that there is a requirement for keeping the operation of the engine 22, executes the processing of and after step S290, and then exits from the drive control routine. When it is determined that the engine 22 is in operation stop, the CPU 72 decides that it is requirement for starting up the engine 22, executes the processing of and after step S240, and then exits from the drive control routine. That is to say, when the torque demand Tr* is out of the range of the lower motor travel allowable torque Tmin and the upper motor travel allowable torque Tmax, the CPU 72 controls the engine 22 and the motors MG1 and MG2 so that the hybrid vehicle 20 is driven with output power from the engine 22. In this embodiment, as described above, at the first connection state or the second connection state, the CPU 72 sets the control input limit Win and the control output limit Wout that are larger in absolute than at the slave shutoff state, and sets the lower motor travel allowable torque Tmin and the upper motor travel allowable torque Tmax that are larger in absolute than at the slave shutoff state. Therefore, at the first connection state or the second connection state before the accumulated charge amount condition is satisfied, such control enables to prevent the engine 22 from being started by the torque demand Tr* than after the accumulated charge amount condition is satisfied.

When the vehicle speed V is more than or equal to the intermittent operation prohibition vehicle speed Vpr at step S150, it is decided that the intermittent operation of the engine 22 is prohibited, and the CPU 72 determines that engine 22 is in operation stop (step S270). When the engine 22 is not in operation stop, that is, the engine 22 is in operation, the CPU 72 decides that there is the requirement for keeping the operation of the engine 22, executes the processing of and after S290, and then exits from the drive control routine. When it is determined that the engine 22 is in operation stop, the CPU 72 decides that it is requirement for starting up the engine 22, executes the processing of and after step S240, and then exits from the drive control routine. That is to say, when the vehicle speed V is more than the intermittent operation prohibition vehicle speed Vpr, the CPU 72 controls the engine 22 and the motors MG1 and MG2 so that the hybrid vehicle 20 is driven with the operation of the engine 22. In this embodiment, as described above, when the accumulated charge amount condition flag F is value '0' (before the accumulated charge amount is satisfied) and the vehicle speed is less than the intermittent operation prohibition vehicle speed Vpr, the hybrid vehicle 20 is driven in the motor travel where the hybrid vehicle 20 is driven only with input and output power to and from the motor MG2 (the hybrid vehicle 20 is driven with the priority to the motor travel) regardless of the power demand Pe* as a condition where the torque demand Tr* is within the lower motor travel allowable torque Tmin and the upper motor travel allowable torque Tmax, and when the accumulated charge amount condition flag F is value '0', the vehicle speed V1 that is higher than when the accumulated charge amount condition flag F is value '1' is set as the intermittent operation prohibition vehicle speed Vpr. Thus, the upper limit of the vehicle speed for not prohibiting the intermittent operation is higher. Therefore, such control enables the hybrid vehicle 20 to be driven with more priority to the motor travel with operation stop of the engine 22. On the other hand, when the accumulated charge amount condition flag F is value '1', the vehicle speed V2 that is relatively low is set as the intermittent operation prohibition vehicle speed Vpr. Therefore, such control enables to more sufficiently prevent a disadvantage of operation stop of the engine 22 in a high vehicle speed range. The disadvantages, for example, decrease of responsiveness against an acceleration request by the driver in the high vehicle speed range, and decrease in opportunities to perform abnormal diagnosis of the engine 22, a purification system for purifying exhaust from the engine 22, and sensors that measure states of engine 22 and the purification system can be prevented.

In the hybrid vehicle 20 of the embodiment described above, before the accumulated charge amount condition where the accumulated charge amount SOC1 of the master battery 50 becomes less than or equal to the preset value Sref1, the accumulated charge amount SOC2 of the slave batteries 60 becomes less than or equal to the preset value Sref2 and the accumulated charge amount SOC3 of the slave batteries 62 becomes less than or equal to the preset value Sref3, is satisfied, the vehicle speed V1 that is higher than after the accumulated charge amount condition is satisfied is set as the intermittent operation prohibition vehicle speed Vpr. In this arrangement, when the vehicle speed V is more than or equal to the intermittent operation vehicle speed Vpr, the engine 22, the motors MG1 and MG2, the master side step-up circuit 55 and the slave side step-up circuit 65 are controlled so that the torque demand Tr* within the range of the control input limit Win and the control output limit Wout is output to the ring gear shaft 32a or the driveshaft with the continuous operation of the engine 22, and when the vehicle speed V is less than the intermittent operation vehicle speed Vpr, the engine 22, the motors MG1 and MG2, the master side step-up circuit 55 and the slave side step-up circuit 65 are controlled so that the torque demand Tr* within the range of the control input limit Win and the control output limit Wout is output to the ring gear shaft 32a with the priority to the motor travel where the hybrid vehicle 20 is driven only with input and output power to and from the motor MG2. This arrangement enables the hybrid vehicle 20 to be driven more certainly in the motor travel before the accumulated charge amount condition is satisfied. In the hybrid vehicle 20 of the embodiment, on the other hand, after the accumulated charge amount condition is satisfied, the vehicle speed V2 that is lower than before the accumulated charge amount condition is satisfied is set as the intermittent operation prohibition vehicle speed Vpr. In this arrangement, when the vehicle speed V is more than or equal to the intermittent operation vehicle speed Vpr, the engine 22, the motors MG1 and MG2, the master side step-up circuit 55 and the slave side step-up circuit 65 are controlled so that the torque demand Tr* within the range of the control input limit Win and the control output limit Wout is output to the ring gear shaft 32a with the continuous operation of the engine 22, and when the vehicle speed V is less than the intermittent operation vehicle speed Vpr, the engine 22, the motors MG1 and MG2, the master side step-up circuit 55 and the slave side step-up circuit 65 are controlled so that the torque demand Tr* within the range of the control input limit Win and the control output limit Wout (which are equivalent to the input limit Win1 and the output limit Wout1 of the master battery 50, in this case) is output to the ring gear shaft 32a with the intermittent operation of the engine 22. This arrangement enables to more sufficiently prevent the disadvantage of operation stop of the engine 22 in a high vehicle speed range.

In the hybrid vehicle 20 of the embodiment, in the case that the vehicle speed V is less than the intermittent operation prohibition vehicle speed Vpr and the torque demand Tr* is within the lower motor travel allowable torque Tmin and the upper motor travel allowable torque Tmax before the accumulated charge amount condition is satisfied, the hybrid vehicle 20 is driven with output power of the torque demand Tr* from the motor MG2 to the ring gear shaft 32a for driving the hybrid vehicle 20 in operation stop of the engine 22 regardless of the power demand Pe*. This is not essential. In a case that the motor travel priority cancellation switch 89

Figure 11:
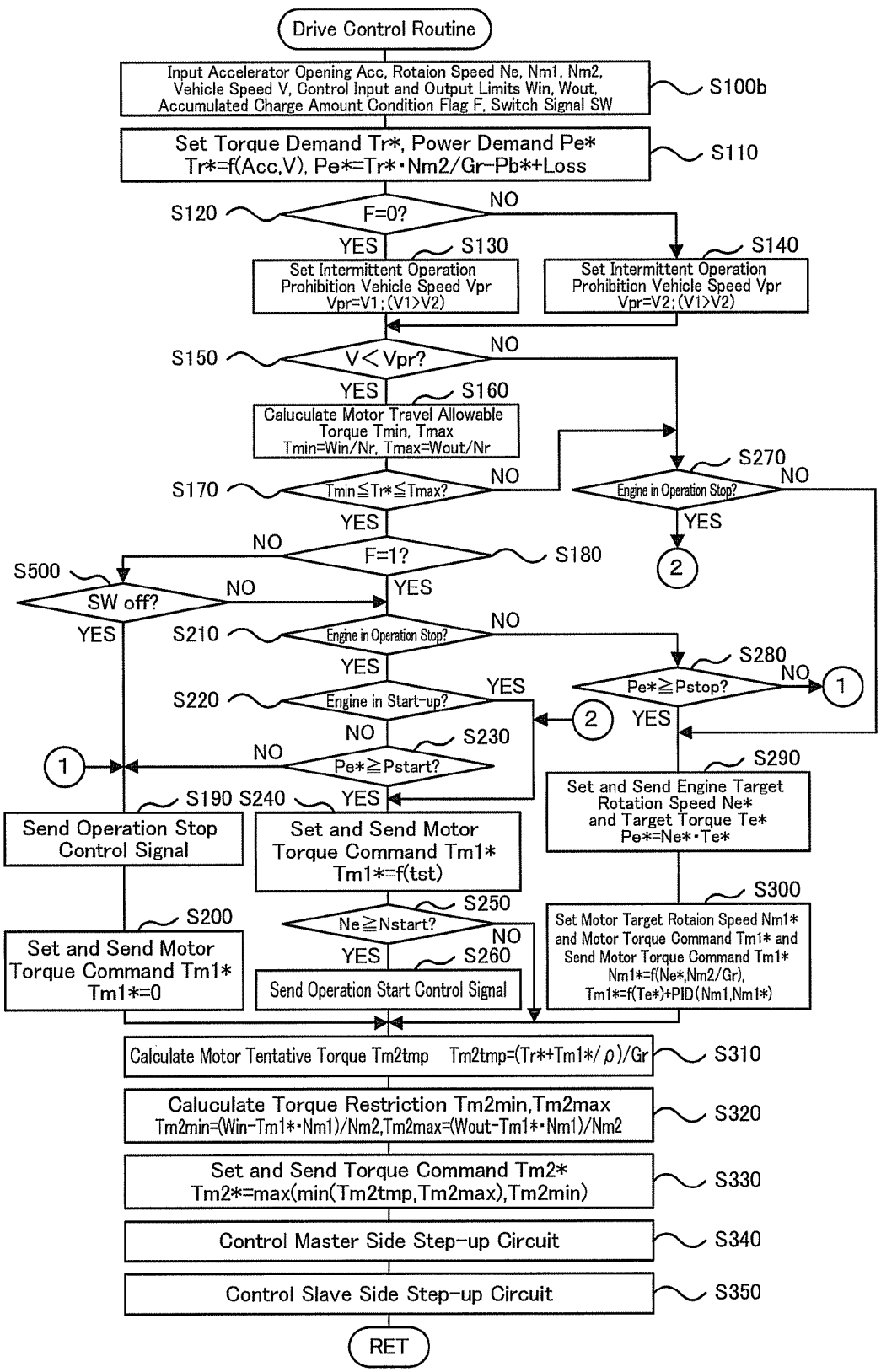
FIG. 11 is a flowchart showing the drive control routine executed by the hybrid electronic control unit 70 in another modified example.

(that instructs cancellation of a priority to the motor travel) is on even before the accumulated charge amount condition is satisfied, the hybrid vehicle 20 may be driven with the intermittent operation of the engine 22. FIG. 11 is a flowchart showing the drive control routine with such modification. This routine is same as the drive control routine of FIG. 4, except for a point executing a processing of step S110b instead of the processing of step S100 and a point adding a processing of step S500. Thus, in the drive control routine of FIG. 11, the same processing as the processing of the drive control routine of FIG. 4 is expressed by the same step numbers as step numbers of the drive control routine of FIG. 4 and is not specifically explained here. In the drive control routine of FIG. 11, the CPU 72 inputs the accelerator opening Acc, the vehicle speed V, the rotation speed Ne of the engine 22, the rotation speeds Nm1 and Nm2 of the motors MG1 and MG2, the control input limit Win, the control output limit Wout, and the accumulated charge condition flag F, in the same way as the processing of step S100 in the drive control routine of FIG. 4 and inputs the switch signal SW from the motor travel priority cancellation switch 89 (step S100b). Then, when the accumulated charge amount condition flag F is value '0' at step S180, the CPU 72 determines whether the motor travel priority cancellation switch 89 is on (whether cancellation of instruction of the priority to the motor travel is given) by checking the switch signal SW (step S500). When the motor travel priority cancellation switch 89 is off, the CPU 72 executes the processing of and after step S190. When the motor travel priority cancellation switch 89 is on, the CPU 72 executes the processing of and after step S210. Therefore, before the accumulated charge amount condition is satisfied, the hybrid vehicle 20 is driven with the priority to the motor travel when the motor travel priority cancellation switch 89 is off, and the hybrid vehicle 20 is driven with the intermittent operation of the engine 22 when the motor travel priority cancellation switch 89 is on.

In the hybrid vehicle 20 of the embodiment, the motor travel priority cancellation switch 89 is included, but the motor travel priority cancellation switch 89 may be omitted from the configuration of the hybrid vehicle 20.

In the hybrid vehicle 20 of the embodiment, the operations to be driven after the system of the hybrid vehicle 20 is started up with the master battery 50 and the slave batteries 60 and 62 being charged enough with electric power from the external power supply 100 are described. Instead, the regardless of in the case that the hybrid vehicle 20 is driven after the system of the hybrid vehicle 20 is started up with the master battery 50 and the slave batteries 60 and 62 being charged enough with electric power from the external power supply 100, in a case that the hybrid vehicle 20 is driven after the system of the hybrid vehicle 20 is started up with the accumulated charge amount SOC1 of the master battery 50 and the accumulated charge amounts SOC2 and SOC3 of the slave batteries 60 and 62 being relatively high, the engine 22, the motors MG1 and MG2, the master side step-up circuit 55 and the slave side step-up circuit 65 may be controlled in the same way as the embodiment.

In the hybrid vehicle 20 of the embodiment, in the case that the vehicle speed V is less than the intermittent operation prohibition vehicle speed Vpr before the accumulated charge amount condition is satisfied, the engine 22, the motors MG1 and MG2, the master side step-up circuit 55 and the slave side step-up circuit 65 are controlled so that the hybrid vehicle 20 is driven only with output power from the motor MG2 when the torque demand Tr* is within the lower motor travel allowable torque Tmin and the upper motor travel allowable torque Tmax, and the engine 22, the motors MG1 and MG2, the master side step-up circuit 55 and the slave side step-up circuit 65 are controlled so that the hybrid vehicle 20 is driven with output power from the engine 22 when the torque demand Tr* is out of the lower motor travel allowable torque Tmin and the upper motor travel allowable torque Tmax. In this case, instead, regardless of whether the torque demand Tr* is within the lower motor travel allowable torque Tmin and the upper motor travel allowable torque Tmax, the engine 22, the motors MG1 and MG2, the master side step-up circuit 55 and the slave side step-up circuit 65 may be controlled so that the hybrid vehicle 20 is driven only with output power from the motor MG2. In the hybrid vehicle 20 of the embodiment, in the case that the vehicle speed V is less than the intermittent operation prohibition vehicle speed Vpr after the accumulated charge amount condition is satisfied, the engine 22, the motors MG1 and MG2, the master side step-up circuit 55 and the slave side step-up circuit 65 are controlled so that the hybrid vehicle 20 is driven with the intermittent operation of the engine 22 corresponding to the power demand Pe* when the torque demand Tr* is within the lower motor travel allowable torque Tmin and the upper motor travel allowable torque Tmax, and the engine 22, the motors MG1 and MG2, the master side step-up circuit 55 and the slave side step-up circuit 65 are controlled so that the hybrid vehicle 20 is driven with output power from the engine 22 when the torque demand Tr* is out of the lower motor travel allowable torque Tmin and the upper motor travel allowable torque Tmax. In this case, instead, regardless of whether the torque demand Tr* is within the lower motor travel allowable torque Tmin and the upper motor travel allowable torque Tmax, the engine 22, the motors MG1 and MG2, the master side step-up circuit 55 and the slave side step-up circuit 65 may be controlled so that the hybrid vehicle 20 is driven with the intermittent operation of the engine 22 corresponding to the power demand Pe*.

In the hybrid vehicle 20 of the embodiment, the master battery 50, the master side step-up circuit 55, the slave batteries 60 and 62 and the slave side step-up circuit 65 are included. Instead, regardless of installation of two slave batteries, one slave battery may be included or not less than three slave batteries may be included. The slave batteries 60 and 62 and the slave side step-up circuit 65 may be omitted from the configuration of the hybrid vehicle. In a case that the slave batteries 60 and 62 and the slave side step-up circuit 65 are omitted from the configuration of the hybrid vehicle, the engine 22, the motors MG1 and MG2 and the master side step-up circuit 55 may be controlled so that the hybrid vehicle 20 is driven in the same way as the embodiment when the hybrid vehicle 20 is driven after the system of the hybrid vehicle 20 is started up with the accumulated charge amount SOC1 of the master battery 50 being relatively high. That is to say, in the case, the vehicle speed V1 may be set as the intermittent operation prohibition vehicle speed Vpr before the accumulated charge amount condition where the accumulated charge amount SOC1 becomes less than or equal to the preset value Sref1 is satisfied, and the vehicle speed V2 that is less than the vehicle speed V1 may be set as the accumulated charge amount SOC2 after the accumulated charge amount condition is satisfied. Then, the engine 22, the motors MG1 and MG2 and the master side step-up circuit 55 may be controlled so that the hybrid vehicle 20 is driven with the priority to the motor travel when the vehicle speed V is less than the intermittent operation vehicle speed Vpr before the accumulated charge amount condition, the engine 22, the motors MG1 and MG2 and the master side step-up circuit 55 may be controlled so that the hybrid vehicle 20 is driven with the intermittent operation of the engine 22 when the vehicle speed V is less than the intermittent operation vehicle speed Vpr after the accumulated charge amount condition, and the engine 22, the motors MG1 and MG2 and the master side step-up circuit 55 may be controlled so that the hybrid vehicle 20 is driven with the continuous operation of the engine 22 regardless of whether the accumulated charge amount condition is satisfied when the vehicle speed V is more than or equal to the intermittent operation vehicle speed Vpr.

In the hybrid vehicle 20 of the embodiment, the master side step-up circuit 55 supplying electric power from the master battery 50 to the inverters 41 and 42 with voltage step-up is included, but the master side step-up circuit 55 may be omitted from the configuration of the hybrid vehicle.

In the hybrid vehicle 20 of the embodiment, the motor MG2 is attached to the ring gear shaft 32a or the driveshaft via the reduction gear 35. The technique of the invention is also applicable to the motor MG2 directly attached to the ring gear shaft 32a, and also applicable to the motor MG2 attached to the ring gear shaft 32a via a transmission such as a two-stage, three-stage, or four-stage transmission in place of the reduction gear 35.

Figure 12:
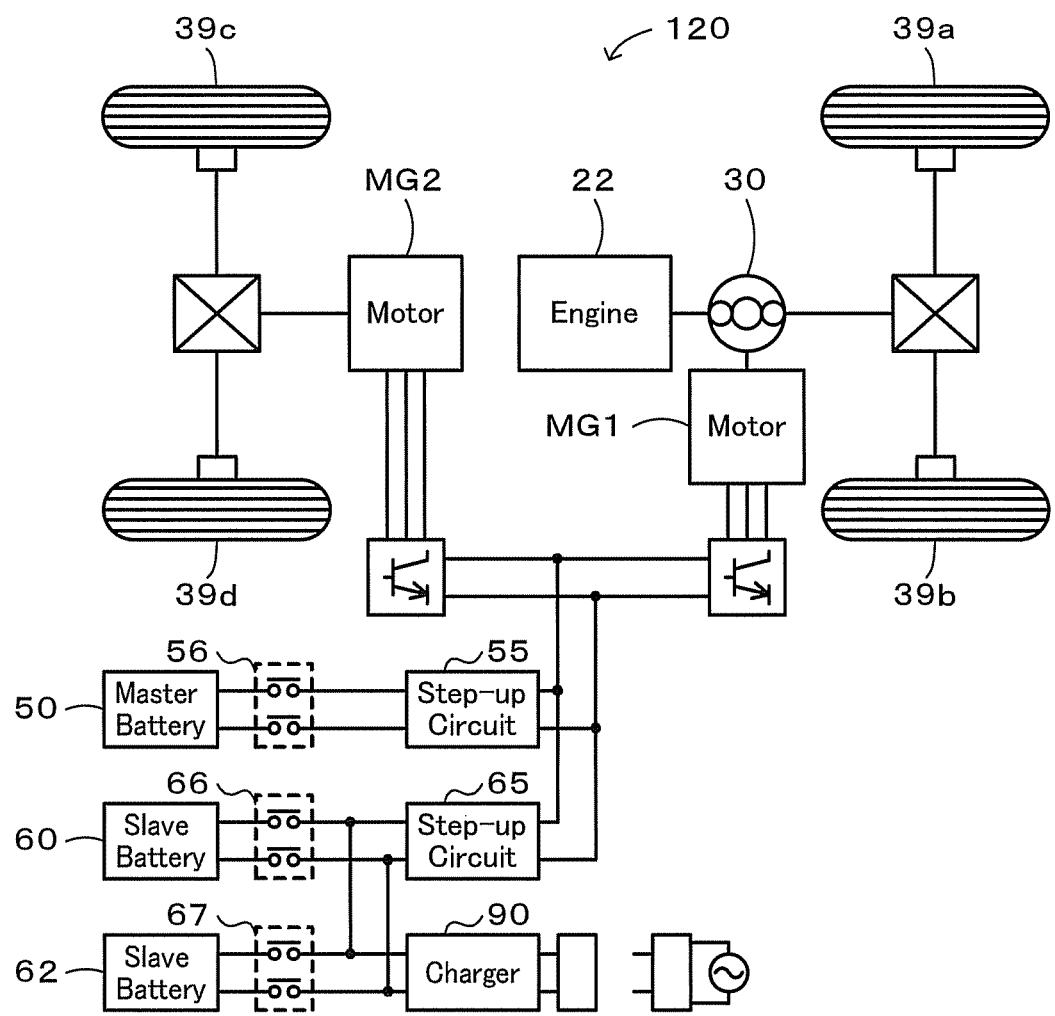
FIG. 12 schematically illustrates the configuration of another hybrid vehicle 120 in one modified example.

In the hybrid vehicle 20 of the embodiment, the power of the motor MG2 is converted by the reduction gear 35 and is output to the ring gear shaft 32a. The technique of the invention is also applicable to a hybrid vehicle 120 of a modified structure shown in FIG. 12. In the hybrid vehicle 120 of FIG. 12, the power of the motor MG2 is output to another axle (an axle linked with wheels 39c and 39d in FIG. 12) that is different from the axle connecting with the ring gear shaft 32a (the axle linked with the drive wheels 39a and 39b).

In the hybrid vehicle 20 of the embodiment, the hybrid vehicle has the engine 22, the power distribution integration mechanism 30 and the motors MG1 and MG2. The technique of the invention is applicable to any type of hybrid vehicles having an engine that outputs power for driving the hybrid vehicle, and a motor that outputs power for driving the hybrid vehicle, being driven with the intermittent operation of the engine.

The embodiment and its modified examples described above regard application of the invention to the hybrid vehicle. The technique of the invention is applicable to any vehicle such as a train other than the automobile and to a control method of the hybrid vehicle.

The primary elements in the embodiment and its modified examples are mapped to the primary constituents in the claims of the invention as described below. The engine 22 in the embodiment corresponds to the 'internal combustion engine' in the claims of the invention. The motor MG1 in the embodiment corresponds to the 'generator' in the claims of the invention. The motor MG2 in the embodiment corresponds to the 'motor' in the claims of the invention. The master battery 50 in the embodiment corresponds to the 'accumulator' in the claims of the invention. The vehicle speed sensor 88 in the embodiment corresponds to the 'vehicle speed detector' in the claims of the invention. The hybrid electronic control unit 70 executing the processing of step S110 in the drive control routine of FIG. 4 to set the torque demand Tr* based on the accelerator opening Acc and the vehicle speed V in the embodiment corresponds to the 'driving power demand setting module' in the claims of the invention. The hybrid electronic control unit 70 executing the processing of steps S120 through S140 in the drive control routine of FIG. 4 to set the vehicle speed V1 as the intermittent operation prohibition vehicle speed before the satisfaction of the accumulated charge amount condition where the accumulated charge amount SOC1 of the master battery 50 becomes less than or equal to the preset value Sref1, the accumulated charge amount SOC2 of the slave battery 60 becomes less than or equal to the preset value Sref2 and the accumulated charge amount SOC3 of the slave battery 62 becomes less than or equal to the preset value Sref3, to set the vehicle speed V2 that is less than the vehicle speed V1 as the intermittent operation prohibition vehicle speed after the satisfaction of the accumulated charge amount condition, corresponds to the 'intermittent operation prohibition vehicle speed setting module' in the claims of the invention. The combination of the hybrid electronic control unit 70, the engine ECU 24, and the motor ECU 40 in the embodiment corresponds to the 'control module' in the claims of the invention. The hybrid electronic control unit 70 executes the processing of steps S150 through S350 in the drive control routine of FIG. 4. The hybrid electronic control unit 70 sets the target rotation speed Ne* and the target torque Te* to send the set target rotation speed Ne* and the set target torque Te* to engine ECU 24, sends the operation start signal to the engine ECU 24, and sets the torque commands Tm1* and Tm2* to send the set torque commands Tm1* and Tm2* to the motor ECU 40, so that the hybrid vehicle 20 is driven with output of the torque demand Tr* within the range of the control input limit Win and the control output limit Wout to the ring gear shaft 32a or the driveshaft with the continuous operation of the engine 22, in the case the vehicle speed V is more than or equal to the intermittent operation prohibition vehicle speed Vpr. The hybrid electronic control unit 70 sends the operation stop signal and the operation start signal to the engine ECU 24, sets the target rotation speed Ne* and the target torque Te* to send the set target rotation speed Ne* and the set target torque Te* to engine ECU 24, and sets the torque commands Tm1* and Tm2* to send the set torque commands Tm1* and Tm2* to the motor ECU 40, so that the hybrid vehicle 20 is driven with output of the torque demand Tr* within the range of the control input limit Win and the control output limit Wout to the ring gear shaft 32a or the driveshaft with the priority to the motor travel between the motor travel where the hybrid vehicle 20 is driven only with input and output power to and from the motor MG2 and the hybrid travel where the hybrid vehicle 20 is driven with output power from the engine 22, in the case the vehicle speed V is less than the intermittent operation prohibition vehicle speed Vpr before the accumulated charge amount condition is satisfied. The hybrid electronic control unit 70 sends the operation stop signal and the operation start signal to the engine ECU 24, sets the target rotation speed Ne* and the target torque Te* to send the set target rotation speed Ne* and the set target torque Te* to engine ECU 24, and sets the torque commands Tm1* and Tm2* to send the set torque commands Tm1* and Tm2* to the motor ECU 40, so that the hybrid vehicle 20 is driven with output of the torque demand Tr* within the range of the control input limit Win and the control output limit Wout to the ring gear shaft 32a or the driveshaft with the intermittent operation of the engine 22, after the accumulated charge amount condition is satisfied. The hybrid electronic control unit 70 controls the master side step-up circuit 55 so that the voltage of the high-voltage system becomes the target voltage VH* and controls the slave side step-up circuit 65 so that electric power Pbs supplied from the connection side slave battery (one slave battery connected to the slave side step-up circuit 65 between the slave batteries 60 and 62) to the side of the inverters 41 and 42 becomes a target charge-discharge power Pbs*. The engine ECU 24 controls the engine 22 based on the target rotation speed Ne* and the target, torque Te*, controls the engine 22 based on the target rotation speed Ne* and a self-sustained operation signal, starts up the engine 22 based on the operation start signal, and stop the engine 22 based on the operation top signal. The motor ECU 40 controls the motors MG1 and MG2 based on the torque commands Tm1* and Tm2*. The charger 90 in the embodiment corresponds to the 'charger' in the claims of the invention. Internal motor travel priority cancellation switch 89 in the embodiment corresponds to the 'cancellation instruction switch' in the claims of the invention. The hybrid electronic control unit 70 executing the processing of step S160 in the drive control routine of FIG. 4 to calculate the lower motor travel allowable torque Tmin and the upper motor travel allowable torque Tmax by diving the control input Limit Win or the control output limit Wout by the rotation speed Nr of the ring gear shaft 32a in the embodiment corresponds to the 'driving power limit setting module' in the invention. The master side step-up circuit 55 in the embodiment corresponds to the 'first voltage converter' in the invention. The slave battery 60 in the embodiment corresponds to 'second accumulator' in the invention. The slave battery 62 in the embodiment corresponds to the 'third accumulator' in the invention. The slave side step-up circuit 65 in the embodiment corresponds to the 'second voltage converter'.

The 'internal combustion engine' is not restricted to the engine 22 designed to consume a hydrocarbon fuel, such as gasoline or light oil, and thereby output power, but may be any type of internal combustion engine that outputs power for driving the hybrid vehicle, for example, a hydrogen engine. The 'generator' is not restricted to the motor MG1 constructed as a synchronous motor generator but may be any type of generator that generates electric power using output power from the internal combustion engine, for example, an induction motor. The 'motor' is not restricted to the motor MG2 constructed as a synchronous motor generator but may be any type of motor that inputs and outputs power for driving the hybrid vehicle, for example, an induction motor. The 'accumulator' is not restricted to the master battery 50 constructed as the lithium-ion secondary battery but may be any other arrangement of transmitting electric power to and from the generator and the motor, for example, a nickel metal hydride secondary battery, a lead acid secondary battery, or a capacitor. The 'vehicle speed detector' is not restricted to the vehicle speed sensor 88 but may be any other arrangement of detecting vehicle speed, for example, an arrangement of calculating the vehicle speed V based on the rotation speed of the ring gear shaft 32a or the driveshaft, or an arrangement of calculating the vehicle speed V based on the signals from wheel speed sensors attached to the drive wheels 39a and 39b or driven wheels. The 'driving power demand setting module' is not restricted to the arrangement of setting the torque demand Tr* based on the accelerator opening Acc and the vehicle speed V but may be any other arrangement of setting a driving power demand required for driving the hybrid vehicle, for example, an arrangement of setting the torque demand based only on the accelerator opening Acc or an arrangement of setting the torque demand based on a location of the hybrid vehicle on a preset drive route. The 'intermittent operation prohibition vehicle speed setting module' is not restricted to the arrangement of setting the vehicle speed V1 as the intermittent operation prohibition vehicle speed before the satisfaction of the accumulated charge amount condition where the accumulated charge amount SOC1 of the master battery 50 becomes less than or equal to the preset value Sref1, the accumulated charge amount SOC2 of the slave battery 60 becomes less than or equal to the preset value Sref2 and the accumulated charge amount SOC3 of the slave battery 62 becomes less than or equal to the preset value Sref3, and setting the vehicle speed V2 that is less than the vehicle speed V1 as the intermittent operation prohibition vehicle speed after the satisfaction of the accumulated charge amount condition, but may be any other arrangement of setting a first vehicle speed as an intermittent operation prohibition vehicle speed for prohibiting an intermittent operation of the internal combustion engine before an accumulated charge amount condition where a state of the accumulator becomes a predetermined low accumulated charge amount state is satisfied after a system of the hybrid vehicle is started up, while setting a second vehicle speed that is less than the first vehicle speed as the intermittent operation prohibition vehicle speed after the accumulated charge amount condition is satisfied, for example, an arrangement of deciding that the accumulated charge amount condition is satisfied when the accumulated charge amount SOC1 of the master battery 50 becomes less than or equal to the preset value Sref1. The 'control module' is not restricted to the combination of the hybrid electronic control unit 70 with the engine ECU 24 and the motor ECU 40 but may be actualized by a single electronic control unit. The 'control module' is not restricted to the arrangement of controlling the engine 22, the motors MG1 and MG2, the master side step-up circuit 55 and the slave side step-up circuit 65 to output the torque demand Tr* within the range of the control input limit Win and the control output limit Wout to the ring gear shaft 32a or the driveshaft with the continuous operation of the engine 22, in the case that the vehicle speed V is more than or equal to the intermittent operation prohibition vehicle speed Vpr, controlling the engine 22, the motors MG1 and MG2, the master side step-up circuit 55 and the slave side step-up circuit 65 to output the torque demand Tr* within the range of the control input limit Win and the control output limit Wout to the ring gear shaft 32a or the driveshaft with the priority to the motor travel between the motor travel where the hybrid vehicle 20 is driven only with input and output power to and from the motor MG2 and the hybrid travel where the hybrid vehicle 20 is driven with output power from the engine 22, in the case that the vehicle speed V is less than the intermittent operation prohibition vehicle speed Vpr before the accumulated charge amount condition is satisfied, and controlling the engine 22, the motors MG1 and MG2, the master side step-up circuit 55 and the slave side step-up circuit 65 to output the torque demand Tr* within the range of the control input limit Win and the control output limit Wout to the ring gear shaft 32a or the driveshaft with the intermittent operation of the engine 22 in the case that the vehicle speed V is less than the intermittent operation prohibition vehicle speed Vpr after the accumulated charge amount condition is satisfied. The 'control module' may be any other arrangement of controlling, in a case that the detected vehicle speed is more than or equal to the set intermittent operation prohibition vehicle speed, the internal combustion engine, the generator, and the motor so that the hybrid vehicle is driven with a driving power corresponding to the set driving power demand with a continuous operation of the internal combustion engine, controlling, in a case that the detected vehicle speed is less than the set intermittent operation prohibition vehicle speed before the accumulated charge amount condition is satisfied, the internal combustion engine, the generator, and the motor so that the hybrid vehicle is driven with the driving power corresponding to the set driving power demand with a priority to motor travel between the motor travel where the hybrid vehicle is driven only with input and output power to and from the motor and hybrid travel where the hybrid vehicle is driven with output power from the internal combustion engine, and controlling, in a case that the detected vehicle speed is less than the set intermittent operation prohibition vehicle speed after the accumulated charge amount condition is satisfied, the internal combustion engine, the generator, and the motor so that the hybrid vehicle is driven with the driving power corresponding to the set driving power demand with the intermittent operation of the internal combustion engine. The 'charger' is not restricted to the charger 90 but may be any other arrangement of being connected to an external power supply that is a power supply outside the hybrid vehicle to charge the accumulator with electric power from the external power supply. The 'cancellation switch' is not restricted to the motor travel priority cancellation switch 89 but may be any other arrangement of instructing cancellation of the priority to the motor travel. The 'driving power limit setting module' is not restricted to the arrangement of calculating the lower motor travel allowable torque Tmin and the upper motor travel allowable torque Tmax by diving the control input Limit Win or the control output limit Wout by the rotation speed Nr of the ring gear shaft 32a but may be any other arrangement of setting a driving power limit of the motor based on input and output limits of the accumulator. The 'first voltage converter' is not restricted to the master side step-up circuit 55 but may be any other arrangement of being connected to first low-voltage system power lines where the accumulator is connected and connected to high-voltage system power lines where a driving circuit of the generator and a driving circuit of the motor are connected, and that supplies electric power from the accumulator to the high-voltage system power lines with voltage step-up. The 'second accumulator' is not restricted to the slave battery 60 constructed as the lithium-ion secondary battery but may be any other arrangement of charging and discharging, for example, a nickel metal hydride secondary battery, a lead acid secondary battery, or a capacitor. The 'third accumulator' is not restricted to the slave battery 62 constructed as the lithium-ion secondary battery but may be any other arrangement of charging and discharging, for example, a nickel metal hydride secondary battery, a lead acid secondary battery, or a capacitor. The 'second voltage converter' is not restricted to the slave side step-up circuit 65 but may be being connected to the high-voltage system power lines and connected to a second low-voltage system power lines where the second accumulator and the third accumulator are connected via each relay, and supplying electric power from one accumulator currently connected to the second low-voltage system power lines between the second accumulator and the third accumulator to the high-voltage system power lines with voltage step-up.

The above mapping of the primary elements in the embodiment and its modified examples to the primary constituents in the claims of the invention is not restrictive in any sense but is only illustrative for concretely describing the modes of carrying out the invention. Namely the embodiment and its modified examples discussed above are to be considered in all aspects as illustrative and not restrictive.

There may be many other modifications, changes, and alterations without departing from the scope or spirit of the main characteristics of the present invention.

INDUSTRIAL APPLICABILITY

The technique of the invention is preferably applied to the manufacturing industries of the hybrid vehicles.

The invention claimed is:

1. A plug-in hybrid vehicle, comprising:
an internal combustion engine;
a motor;
a battery configured to supply and receive electric power to and from the motor, and configured to be charged from an external power supply; and
a control unit;
wherein the control unit of the plug-in hybrid vehicle is programmed to set a hybrid travel mode and a motor travel mode,
wherein in the hybrid travel mode the internal combustion engine is operated,
wherein in the motor travel mode the internal combustion engine is stopped and the hybrid vehicle is driven with the motor output power, and
wherein the control unit of the plug-in hybrid vehicle is further programmed to set a first condition and a second condition, the first condition having a range of a state of charge from a preset value to a value after external charging, the second condition having a range of the state of charge lower than the preset value,
in the first condition, the hybrid vehicle is driven with the hybrid travel mode or the motor travel mode, the internal combustion engine is always operated while the vehicle speed is over a first vehicle speed, and the internal combustion engine is operated and stopped while the vehicle speed is less than the first vehicle speed, and the hybrid vehicle is driven with the motor travel mode in a case that a torque demand is within a range which corresponds to a range between an input limit and an output limit of the battery while the vehicle speed is less than the first vehicle speed,
in the second condition, the hybrid vehicle is driven with the hybrid travel mode or the motor travel mode, the internal combustion engine is always operated while the vehicle speed is over a second vehicle speed, and the hybrid vehicle is not driven with the motor travel mode in the case that a power demand required for the vehicle, including a value corresponding to the torque demand and a value corresponding to a charge demand of the battery, is greater than or equal to a preset value even when the torque demand is within the range which corresponds to the range between the input limit and the output limit of the battery while the vehicle speed is less than the second vehicle speed;
the first vehicle speed is set higher than the second vehicle speed.

2. The plug-in hybrid vehicle according to claim 1, wherein the motor travel mode is more selected in the first condition in comparison to the second condition.

* * * * *